US008705567B2

(12) United States Patent
Denney et al.

(10) Patent No.: US 8,705,567 B2
(45) Date of Patent: *Apr. 22, 2014

(54) UPSTREAM CHANNEL BONDING USING LEGACY MAPS IN A CABLE COMMUNICATIONS SYSTEM

(75) Inventors: Lisa Voigt Denney, Suwanee, GA (US); Niki Roberta Pantelias, Duluth, GA (US); A. Scott Hollums, Duluth, GA (US); Victor T. Hou, La Jolla, CA (US); John Daniel Horton, Jr., Alpharetta, GA (US); David Michael Pullen, Hayesville, NC (US)

(73) Assignee: Broadcom Corporation, Irvine, CA (US)

( * ) Notice: Subject to any disclaimer, the term of this patent is extended or adjusted under 35 U.S.C. 154(b) by 1053 days.

This patent is subject to a terminal disclaimer.

(21) Appl. No.: 11/384,409

(22) Filed: Mar. 21, 2006

(65) Prior Publication Data

US 2007/0195817 A1  Aug. 23, 2007

Related U.S. Application Data

(63) Continuation-in-part of application No. 11/298,446, filed on Dec. 12, 2005, and a continuation-in-part of application No. 11/298,447, filed on Dec. 12, 2005, and a continuation-in-part of application No. 11/298,451, filed on Dec. 12, 2005.

(60) Provisional application No. 60/663,578, filed on Mar. 21, 2005, provisional application No. 60/634,809, filed on Dec. 10, 2004.

(51) Int. Cl.
*H04J 3/16* (2006.01)
*H04W 4/00* (2009.01)

(52) U.S. Cl.
USPC .......................................... 370/468; 370/329

(58) Field of Classification Search
USPC ................... 370/468, 477, 461, 329; 725/111
See application file for complete search history.

(56) References Cited

U.S. PATENT DOCUMENTS 6,594,305 B1  7/2003  Roeck et al.
6,650,624 B1  11/2003  Quigley et al.
(Continued)

FOREIGN PATENT DOCUMENTS

CN  1181671 A  5/1989
CN  1440619 A  9/2003
(Continued)

OTHER PUBLICATIONS

European Search Report issued in EP Appl. No. 06005337.8, dated Jun. 27, 2006, 3 pages.
(Continued)

*Primary Examiner* — Mark Rinehart
*Assistant Examiner* — Angel Brockman
(74) *Attorney, Agent, or Firm* — Sterne Kessler Goldstein & Fox PLLC

(57) ABSTRACT

A method for increasing upstream bandwidth per cable modem user in a cable communications system that includes a cable modem termination system (CMTS) and a plurality of cable modems is provided. The method permits a cable modem to transmit data to the CMTS on multiple upstream channels simultaneously using a technique called "channel bonding." Bandwidth allocation is achieved by transmitting from a CMTS to a cable modem a unique bandwidth allocation message for each upstream channel in a bonded group of upstream channels, wherein the combination of unique bandwidth allocation messages collectively allocates requested bandwidth across the bonded group.

20 Claims, 23 Drawing Sheets

(56) References Cited

U.S. PATENT DOCUMENTS

| | | | |
|---|---|---|---|
| 6,775,707 B1 | | 8/2004 | Bennett et al. |
| 6,807,193 B1 | * | 10/2004 | Beser ......................... 370/498 |
| 6,898,755 B1 | * | 5/2005 | Hou ............................ 714/784 |
| 6,961,314 B1 | | 11/2005 | Quigley et al. |
| 7,023,871 B2 | | 4/2006 | Lind et al. |
| 7,050,419 B2 | | 5/2006 | Azenkot et al. |
| 7,106,760 B1 | | 9/2006 | Perumal et al. |
| 7,113,484 B1 | | 9/2006 | Chapman et al. |
| 7,145,997 B2 | | 12/2006 | Poikselka et al. |
| 7,190,683 B2 | | 3/2007 | Giallorenzi et al. |
| 7,333,495 B2 | | 2/2008 | Sala et al. |
| 7,532,627 B2 | | 5/2009 | Chapman et al. |
| 7,970,010 B2 | | 6/2011 | Denney et al. |
| 8,279,892 B2 | | 10/2012 | Denney et al. |
| 2001/0053152 A1 | | 12/2001 | Sala et al. |
| 2002/0080868 A1 | | 6/2002 | Bunn et al. |
| 2002/0093955 A1 | | 7/2002 | Grand et al. |
| 2002/0136291 A1 | | 9/2002 | Sala et al. |
| 2003/0067883 A1 | | 4/2003 | Azenkot et al. |
| 2003/0103527 A1 | | 6/2003 | Beser |
| 2003/0152095 A1 | | 8/2003 | Foore et al. |
| 2003/0177502 A1 | | 9/2003 | Kolze et al. |
| 2004/0162020 A1 | * | 8/2004 | Dale et al. .................... 455/12.1 |
| 2004/0244043 A1 | * | 12/2004 | Lind et al. ..................... 725/111 |
| 2005/0122996 A1 | * | 6/2005 | Azenkot et al. ............... 370/477 |
| 2005/0232304 A1 | | 10/2005 | Quigley |
| 2005/0265376 A1 | * | 12/2005 | Chapman et al. ............. 370/461 |
| 2006/0039380 A1 | | 2/2006 | Cloonan et al. |
| 2006/0126505 A1 | | 6/2006 | Denney et al. |
| 2006/0126506 A1 | | 6/2006 | Denney et al. |
| 2006/0126660 A1 | | 6/2006 | Denney et al. |
| 2006/0153093 A1 | | 7/2006 | Cloonan et al. |
| 2007/0109995 A1 | * | 5/2007 | Quigley et al. ............... 370/329 |
| 2010/0296511 A1 | | 11/2010 | Prodan et al. |
| 2013/0070784 A1 | | 3/2013 | Denney et al. |

FOREIGN PATENT DOCUMENTS

| | | |
|---|---|---|
| CN | 1466850 A | 1/2004 |
| CN | 101073260 A | 11/2007 |
| TW | 321809 | 12/1997 |
| TW | 503637 B | 9/2002 |
| TW | 576028 B | 2/2004 |
| WO | WO 2006/020559 | 2/2006 |

OTHER PUBLICATIONS

International Search Report issued in International Appl. No. PCT/US05/44780, dated Jul. 12, 2006, 7 pages.
Data-Over-Cable Service Interface Specifications, DOCSIS 2.0, Radio Frequency Interface Specification, CM-SP-RFIv2.0-I10-051209, Cable Television Laboratories, Inc., Dec. 9, 2005, 538 pgs.
Non-Final Rejection mailed Mar. 11, 2009 for U.S. Appl. No. 11/298,446, 13 pgs.
Non-Final Rejection mailed Jan. 6, 2009 for U.S. Appl. No. 11/298,447, 23 pgs.
Second Non-Final Rejection mailed Jun. 10, 2009 for U.S. Appl. No. 11/298,447, 20 pgs.
Non-Final Rejection mailed Oct. 6, 2008 for U.S. Appl. No. 11/298,451, 19 pgs.
Second Non-Final Rejection mailed Jun. 8, 2009 for U.S. Appl. No. 11/298,451, 4 pgs.
Final Rejection mailed Sep. 29, 2009 for U.S. Appl. No. 11/298,446, 17 pgs.
Non-Final Rejection mailed Jan. 29, 2010 for U.S. Appl. No. 11/298,446, 11 pgs.
Third Non-Final Rejection mailed Jan. 6, 2010 for U.S. Appl. No. 11/298,447, 23 pgs.
Final Rejection mailed Jul. 23, 2010 for U.S. Appl. No. 11/298,446, 11 pgs.
Fourth Non-Final Rejection mailed Jul. 7, 2010 for U.S. Appl. No. 11/298,447, 21 pgs.
Non-Final Rejection mailed Mar. 23, 2010 for U.S. Appl. No. 11/298,451, 7 pgs.
Examination issued in EP Appl. No. 06005337.8, dated Oct. 8, 2009, 5 pages.
European Search Report directed to related European Application No. 05853648.3-1244, mailed Jan. 25, 2011, from the European Patent Office, Rijswijk, Netherlands, 8 pgs.
European Search Report directed to related European Application No. 05853648.3-1244, mailed Oct. 25, 2011, from the European Patent Office, Rijswijk, Netherlands, 5 pgs.
Third Non-Final Rejection mailed Feb. 15, 2011 for U.S. Appl. No. 11/298,446, filed Dec. 12, 2005, 10 pgs.
Third Final Rejection mailed Jul. 28, 2011 for U.S. Appl. No. 11/298,446, filed Dec. 12, 2005, 11 pgs.
Notice of Allowance mailed May 31, 2012 for U.S. Appl. No. 11/298,446, filed Dec. 12, 2005, 8 pgs.
Fifth Non-Final Rejection mailed Dec. 22, 2010 for U.S. Appl. No. 11/298,447, 17 pgs.
Sixth Non-Final Rejection mailed Jun. 30, 2011 for U.S. Appl. No. 11/298,447, 20 pgs.
Seventh Non-Final Rejection mailed Dec. 28, 2011 for U.S. Appl. No. 11/298,447, 19 pgs.
Eighth Non-Final Rejection mailed Jun. 7, 2012 for U.S. Appl. No. 11/298,447, 33 pgs.
Notice of Allowance mailed Dec. 8, 2009 for U.S. Appl. No. 11/298,451, filed Dec. 12, 2005, 10 pgs.
Second Notice of Allowance mailed Nov. 5, 2010 for U.S. Appl. No. 11/298,451, filed Dec. 12, 2005, 6 pgs.
Third Notice of Allowance mailed Feb. 14, 2011 for U.S. Appl. No. 11/298,451, filed Dec. 12, 2005, 7 pgs.
Final Rejection mailed Dec. 21, 2012 for U.S. Appl. No. 11/298,447, filed Dec. 12, 2005, 20 pages.
Notice of Allowance mailed Apr. 11, 2013 for U.S. Appl. No. 11/298,447, filed Dec. 12, 2005, 8 pages.
Non-Final Rejection mailed Mar. 11, 2013, for U.S. Appl. No. 13/618,095, filed Sep. 14, 2012, 14 pages.
Examination Report dated Jun. 25, 2013, issued in European Application No. 05853648.3, 4 pages.
Notice of Allowance mailed Aug. 27, 2013 for U.S. Appl. No. 11/298,447, filed Dec. 12, 2005.
English Abstract for CN 1181671 A, published May 13, 1998, retrieved from http://worldwide.espacenet.com, 1 page.
English Abstract for CN 1440619 A, published Sep. 3, 2003, retrieved from http://worldwide.espacenet.com, 2 pages.
English Abstract for CN 1466850 A, published Jan. 7, 2004, retrieved from http://worldwide.espacenet.com, 2 pages.
English Abstract for CN 101073260 A, published Nov. 14, 2007, retrieved from http://worldwide.espacenet.com, 2 pages.
English Abstract for TW 321809, published Dec. 1, 2007, retrieved from http://twpat1.tipo.gov.tw, 1 page.
English Abstract for TW 503637 B, published Sep. 21, 2002, retrieved from http://worldwide.espacenet.com, 2 pages.
English Abstract for TW 576028 B, published Feb. 11, 2004, retrieved from http://worldwide.espacenet.com, 1 page.

* cited by examiner

UPSTREAM CHANNEL BONDING USING LEGACY MAPS IN A CABLE COMMUNICATIONS SYSTEM

CROSS-REFERENCE TO RELATED APPLICATIONS

This application claims the benefit of U.S. Provisional Patent Application No. 60/663,578, entitled "UPSTREAM CHANNEL BONDING USING LEGACY MAPS IN A CABLE MODEM SYSTEM," filed Mar. 21, 2005, which is incorporated by reference herein in its entirety.

This application is a continuation-in-part of the following three U.S. patent applications, each of which is incorporated by reference herein in its entirety: U.S. patent application Ser. No. 11/298,446, filed on Dec. 12, 2005, U.S. patent application Ser. No. 11/298,447, filed on Dec. 12, 2005, and U.S. patent application Ser. No. 11/298,451, filed on Dec. 12, 2005. Each of these three applications claim the benefit of U.S. Provisional Patent Application No. 60/634,809, filed Dec. 10, 2004, which is also incorporated by reference herein in its entirety.

BACKGROUND OF THE INVENTION

1. Field of the Invention

The present invention is directed to a method for transmitting data in a data communications system, such as, but not limited to, a cable communications system.

2. Background

Conventional cable communications systems typically employ a cable modem headend that manages communications with a plurality of cable modems. The headend defines the upstream operating characteristics that enable the cable modems to send carrier signals upstream to the headend. The upstream may include multiple channels that can be assigned to the cable modems. These channels are separated from each other by operating at different frequencies.

One or more cable modems use a designated frequency channel to transmit a carrier signal carrying requests and/or data to the headend. The headend receives the upstream signal at a demodulator that interfaces with the physical spectrum interconnecting the cable modems with the headend. The demodulator recovers the underlying requests and/or grants from the carrier signal and forwards this information to a media access controller (MAC) for additional processing.

Cable Operators would like to be able to provide higher upstream bandwidth per user to compete with Fiber-to-the-Subscriber (FTTx) offerings, among others, and services to small businesses. For example, Cable Operators have stated an objective of 100 Megabits per second (Mbps) upstream throughput from a single user or group of users. Using very high orders of modulation (e.g., 1024 QAM) and wider channels in the upstream, however, are currently impractical.

Accordingly, what is needed are a practical method and system for providing increased upstream throughput in a cable communications system.

BRIEF SUMMARY OF THE INVENTION

One way to achieve increased upstream throughput in a cable communications system is to enable a user or group of users to transmit on multiple upstream channels simultaneously. This technique of bonding together smaller bandwidth upstream channels to create a larger bandwidth pipe is referred to herein as "channel bonding." Methods and systems for enabling upstream channel bonding in a cable communications system are described herein.

This specification discloses one or more embodiments that incorporate the features of this invention. The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

In accordance with a first embodiment of the present invention, a method in a cable modem termination system (CMTS) is provided for high-throughput bandwidth allocation in a cable network. In accordance with the method, a plurality of upstream channels is bonded in a group. A bandwidth request is then received from a cable modem. Responsive to receipt of the bandwidth request, a unique bandwidth allocation message is issued for each upstream channel in the bonded group, wherein the combination of unique bandwidth allocation messages collectively allocates the requested bandwidth across the bonded group for use by the cable modem in transmitting a stream of data packets to the CMTS.

In accordance with a second embodiment of the present invention, a method in a cable modem is provided for high-throughput transmission in a cable network. In accordance with the method, a bandwidth request is transmitted to a CMTS. A plurality of bandwidth allocation messages is then received, wherein each of the plurality of bandwidth allocation messages is uniquely associated with an upstream channel in a bonded group of upstream channels, and wherein the plurality of bandwidth allocation messages collectively allocates the requested bandwidth across the bonded group of upstream channels. A stream of data packets is then transmitted to the CMTS over the bonded group of upstream channels in accordance with the plurality of bandwidth allocation messages.

In accordance with a third embodiment of the present invention, a system for high-throughput bandwidth allocation in a cable network is provided. The system includes a CMTS that is configured to bond a plurality of upstream channels in a group and a cable modem that is configured to transmit a bandwidth request to the CMTS. The CMTS is further configured to transmit a unique bandwidth allocation message for each upstream channel in the bonded group to the cable modem, wherein the combination of unique bandwidth allocation messages collectively allocates the requested bandwidth across the bonded group. The cable modem is further configured to transmit a stream of data packets to the CMTS over the bonded group of upstream channels in accordance with the plurality of bandwidth allocation messages.

Further features and advantages of the present invention, as well as the structure and operation of various embodiments of the present invention, are described in detail below with reference to the accompanying drawings. It is noted that the invention is not limited to the specific embodiments described herein. Such embodiments are provided herein for illustrative purposes only. Additional embodiments will be apparent to persons skilled in the art based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
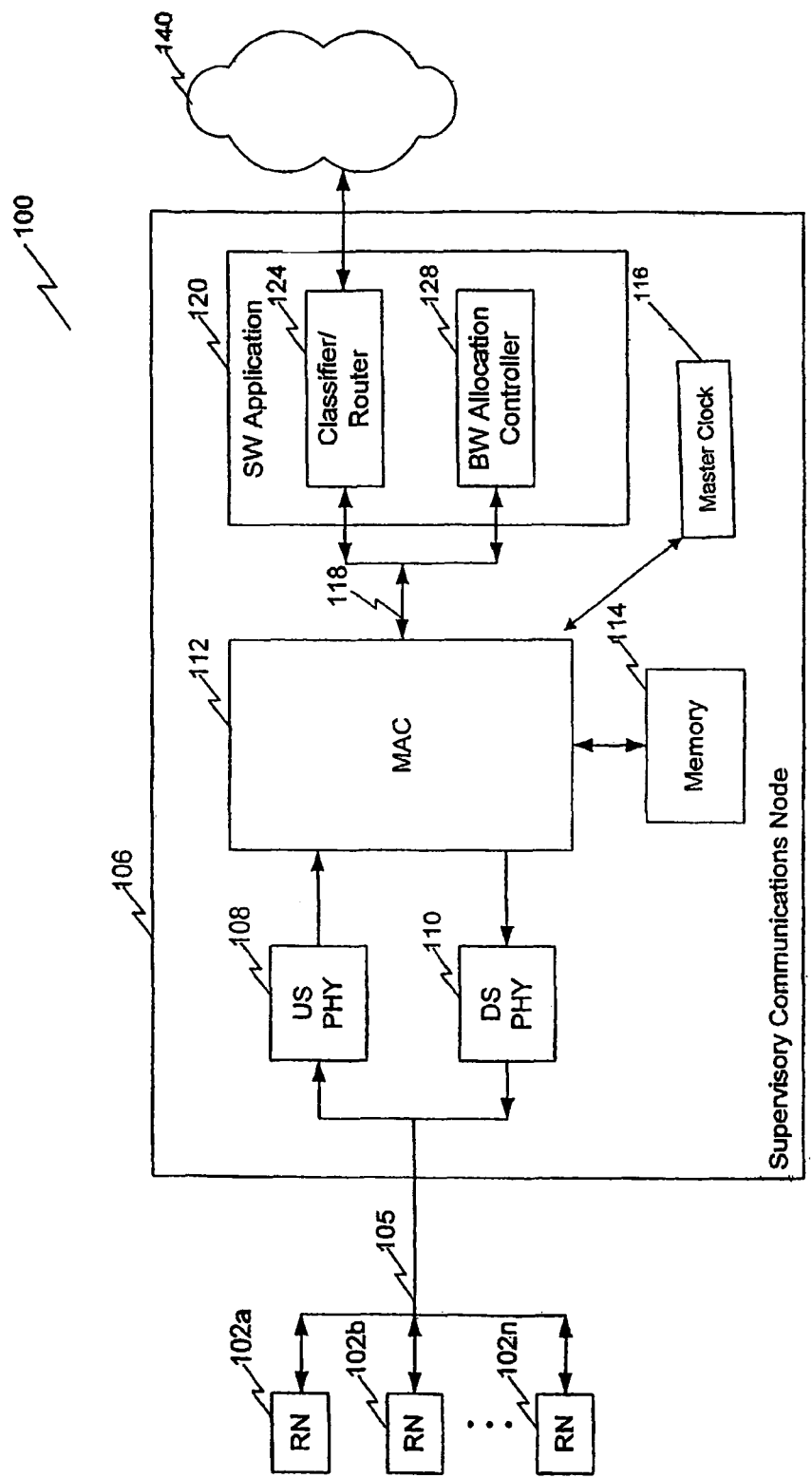
FIG. 1 illustrates an example voice and data communications management system for implementing upstream channel bonding in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Table of Contents

1. Overview
   1.1 System Overview
   1.2 Channel Bonding Overview
   1.3 Terminology
2. Traffic Segmentation
   2.1 Segmentation Overview
   2.2 Continuous Concatenation and Fragmentation
      2.2.1 Conventional DOCSIS Concatenation and Fragmentation
      2.2.2 Continuous Concatenation and Fragmentation in Accordance with an Embodiment of the Present Invention
      2.2.3 Segmentation without Segment Headers
3. Requesting Bandwidth
   3.1 Request Mechanisms
   3.2 Piggyback Requesting
      3.2.1 Example Rules for Piggyback Requesting with Segment Headers On
      3.2.2 Example Rules for Piggyback Requesting with Segment Headers Off
   3.3 Contention Requesting
   3.3.1 Impacts on Legacy Contention Retry Accounting
4. Granting Bandwidth
5. Baseline Privacy Impact
   5.1 Conventional DOCSIS Traffic Encryption
   5.2 Traffic Encryption for Bonded Upstream Channels
      5.2.1 CM Forcing Single Packet Transmission
      5.2.2 Using Dedicated SID with BPI Disabled
      5.2.2 Encrypting on PDU Basis Rather Than Segment Basis
6. System Initialization
   6.1 Partial Channel Operation
7. Detailed MAC Changes
   7.1 Request Message
   7.2 Segment Header Formats
   7.3 Extended Header Formats
      7.3.1 Request EHDR with Length 4
      7.3.2 BP_UP2
   7.4 MAC Management Message Changes
      7.4.1 Bonded Upstream Channel Descriptor (B-UCD)
         7.4.1.1 Removing Channel from Upstream Bonding Group
         7.4.1.2 Adding Channel to Upstream Bonding Group
         7.4.1.3 Replacing Channel in Upstream Bonding Group 7.4.2 MAP Messages
7.4.3 Registration Messages
  7.4.3.1 Upstream Channel Bonding Capability TLV
  7.4.3.2 Maximum Concatenated Burst TLV
  7.4.3.3 Maximum Request Bytes Outstanding TLV
  7.4.3.4 Request/Transmission Policy TLV
  7.4.3.5 Secondary Channel Ranging Technique TLV
7.4.4 Configuration File Changes
  7.4.4.1 Limit on Number of Outstanding Requests
  7.4.4.2 Upstream Bonding Group Override
7.4.5 DCC-REQ Messages
  7.4.5.1 Bonded Upstream Channel ID
7.5 Transmission Region Ordering
  7.5.1 Counting Contention Regions
  7.5.2 Ordering Traffic Across Segments
8. System Synchronization Requirements
9. Miscellaneous Changes
  9.1 Dynamic UCD Changes
  9.2 Appendix B Changes
  9.3 Changes to CM and CMTS Ranging
10. Discussion of Other Mechanisms for Bonding Channels
  10.1 Bonding at the Physical Layer (PHY)
  10.2 Variations of Bonding at the MAC Layer
    10.2.1 Requiring Identical Channel Parameters
    10.2.2 CM Controlling Bonding
  10.3 Bonding at Higher Layers than the MAC Layer
11. Conclusion

1. OVERVIEW

The conventional CableLabs® Certified™ Cable Modem project interface specification, also known as Data Over Cable Service Interface Specification (DOCSIS®) and referred to herein as "legacy" specifications (e.g., DOCSIS 2.0, DOCSIS 1.1 and DOCSIS 1.0), specify interface requirements for cable communications systems, but do not specify interface requirements for implementing upstream channel bonding. Thus, in an embodiment, the upstream channel bonding technique of the present invention is implemented as an extension of the conventional DOCSIS interface specifications. The DOCSIS 2.0 Radio Frequency Interface Specification SP-RFIv2.0-I04-030730, Cable Television Laboratories, Inc., 2005, is herein incorporated by reference in its entirety.

1.1 System Overview

FIG. 1 illustrates a voice and data communications management system 100. Voice and data communications management system 100 is capable of supporting conventional DOCSIS interface requirements, as well as extensions of the conventional DOCSIS interface requirements for implementing upstream channel bonding in accordance with an embodiment of the present invention.

System 100 includes a supervisory communications node 106 and one or more widely distributed remote communications nodes 102a-102n (collectively referred to as "remote communications nodes 102"). System 100 can be implemented in any multimedia distribution network. Furthermore, it should be understood that the method and system of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. Supervisory communications node 106 manages upstream modulation and arbitrates bandwidth among remote communications nodes 102. As described in greater detail below, supervisory communications node 106 establishes the upstream slot structure and allocates upstream bandwidth by sending, for example, an upstream channel descriptor (UCD) message and MAP messages, respectively, to remote communications nodes 102. In an embodiment, the UCD and MAP messages are defined by the conventional DOCSIS specifications.

In an embodiment, supervisory communications node 106 is a component of a headend controller for a cable communications network. As such, supervisory communication node 106 is a cable modem termination system (CMTS) or a component thereof. In an embodiment, at least one remote communications node 102 is a cable modem (CM) or a component thereof. In another embodiment, supervisory communications node 106 is a CMTS and at least one remote communications node 102 is a component of a television set-top box.

As a component of a CM, remote communications node 102 is configurable to transport one or more services to a subscriber. The services may include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, or concerts), and/or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic from those nodes. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment having multiple SIDs assigned to a single remote communications node, a primary SID is used to identify the remote communications node or a general flow from the remote communications node 102, and one or more other SIDs can be used to carry other specific flows, such as phone calls, video streams, messaging, videoconferencing, or the like.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 105. As shown in FIG. 1, internodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

Communications transmitted in the direction from supervisory communications node 106 towards remote communications nodes 102 are referred to herein as being in the downstream. In an embodiment, the downstream is divided into one or more downstream channels. Each downstream channel is configured to carry various types of information to remote communications nodes 102. Such downstream information includes television signals, data packets (including but not limited to IP datagrams), voice packets, control messages, and/or the like. In an embodiment, the downstream is formatted with a motion picture expert group (MPEG) transmission convergence sublayer. However, other data formats can also be supported, as would be apparent to one skilled in the relevant art(s).

Communications transmitted from remote communications nodes 102 towards supervisory communications node 106 are referred to herein as being in the upstream. The upstream is divided into one or more upstream channels. Each upstream channel carries bursts of packets from remote communications nodes 102 to supervisory communications node 106. In accordance with an embodiment of the present invention, multiple upstream channels are bonded together in a bonded channel group to increase upstream throughput. In the upstream, each channel is broken into multiple assignable slots (e.g., minislots), and remote communications nodes 102 send a burst signal in an assigned slot. As discussed above, the slot structure is defined and assigned by supervisory communications node 106.

As shown in FIG. 1, an embodiment of supervisory communications node 106 includes an upstream physical layer demodulator (US PHY) 108, a downstream physical layer modulator (DS PHY) 110, a media access controller (MAC) 112, a memory 114, a software application 120, and a master clock source 116. US PHY 108 forms the physical layer interface between supervisory communications node 106 and the upstream channels of internodal infrastructure 105. Supervisory communications node 106 will include a separate US PHY 108 for each one of the upstream channels. Hence, US PHY 108 receives and demodulates all bursts from remote communications nodes 102.

Conversely, DS PHY 110 forms the physical layer interface between supervisory communications node 106 and the downstream channel(s) of internodal infrastructure 105. Hence, voice, data (including television or radio signals) and/or control messages that are destined for one or more remote communications nodes 102 are collected at DS PHY 110 and transmitted to the respective remote communications nodes 102. DS PHY 110 modulates and/or formats the information for downstream transmission.

MAC 112 receives the upstream signals from US PHY 108 or provides the downstream signals to DS PHY 110, as appropriate. MAC 112 operates as the lower sublayer of the data link layer of supervisory communications node 106. In embodiments, MAC 112 supports fragmentation, concatenation, payload header suppression/expansion, and/or error checking for signals transported over the physical layer (i.e., internodal infrastructure 105).

Memory 114 interacts with MAC 112 to store the signals as they are processed by MAC 112. Memory 114 also stores various auxiliary data used to support the processing activities. Such auxiliary data includes security protocols, identifiers, rules, policies, and the like.

MAC 112 is connected to software application 120 over bus 118, which is a conventional bidirectional bus. Software application 120 operates on one or more processors (or hardware assist devices, such as a field-programmable gate array (FPGA) or application-specific integrated circuit (ASIC)) to receive control messages, voice, and/or data from MAC 112 and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN), wide area networks (WAN), and/or optical networks (such as, an organization's intranet, local internets, the global-based Internet (including the World Wide Web (WWW)), virtual private networks, and/or the like). As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, another remote communications node 102, another supervisory communications node 106, or the like.

When communications management system 100 is used to implement upstream channel bonding, the upstream channels must be synchronized to master clock source 116, in accordance with an embodiment of the present invention. Synchronization is discussed in more detail below in Section 8.

1.2 Channel Bonding Overview

As described above, one way to achieve increased upstream throughput in a cable communications system is to enable a user or group of users to transmit on multiple upstream channels simultaneously. In an embodiment of the present invention, the upstream channel bonding process is controlled by a CMTS as part of the bandwidth granting process. For example, the CMTS can be supervisory communications node 106 of communications management system 100, shown in FIG. 1.

When a CM makes a request for bandwidth for a given service flow on one of its associated upstream channels, the CMTS chooses whether to grant the request on a given channel or over several channels. The CMTS is responsible for allocating the bandwidth across the individual upstream channels. This centralized control allows the system to achieve the best statistical multiplexing possible and allows the CMTS to perform real-time load balancing of the upstream channels within a bonded group. When the CM receives bandwidth grants over multiple channels, it divides its transmission according to the transmit time for each grant and the size of each grant. The CM places an incrementing sequence number in the traffic transmitted in each grant. The grants may be staggered in time across any or all of the upstream channels and may require the CM to transmit on all bonded upstream channels simultaneously. The CMTS then uses the sequence numbers in the traffic to reconstruct the original data stream.

An embodiment of the present invention requires that the upstream channels be synchronized to a master clock source, such as master clock source 116 shown in FIG. 1. This synchronization requirement simplifies the clock domains and timing recovery in the CM, although it is not necessary to practice the present invention. Other than this synchronization requirement, no other requirements are placed on the physical layer (PHY) parameters of any of the channels within the upstream bonding group. The individual channels can be any mix of modulation types, symbol rates, TDMA (Time Division Multiple Access) or S-CDMA (Synchronous Code Division Multiple Access) as specified in the DOCSIS 2.0 specification, and can be any mix of adjacent or non-adjacent upstream channels.

Figure 2:
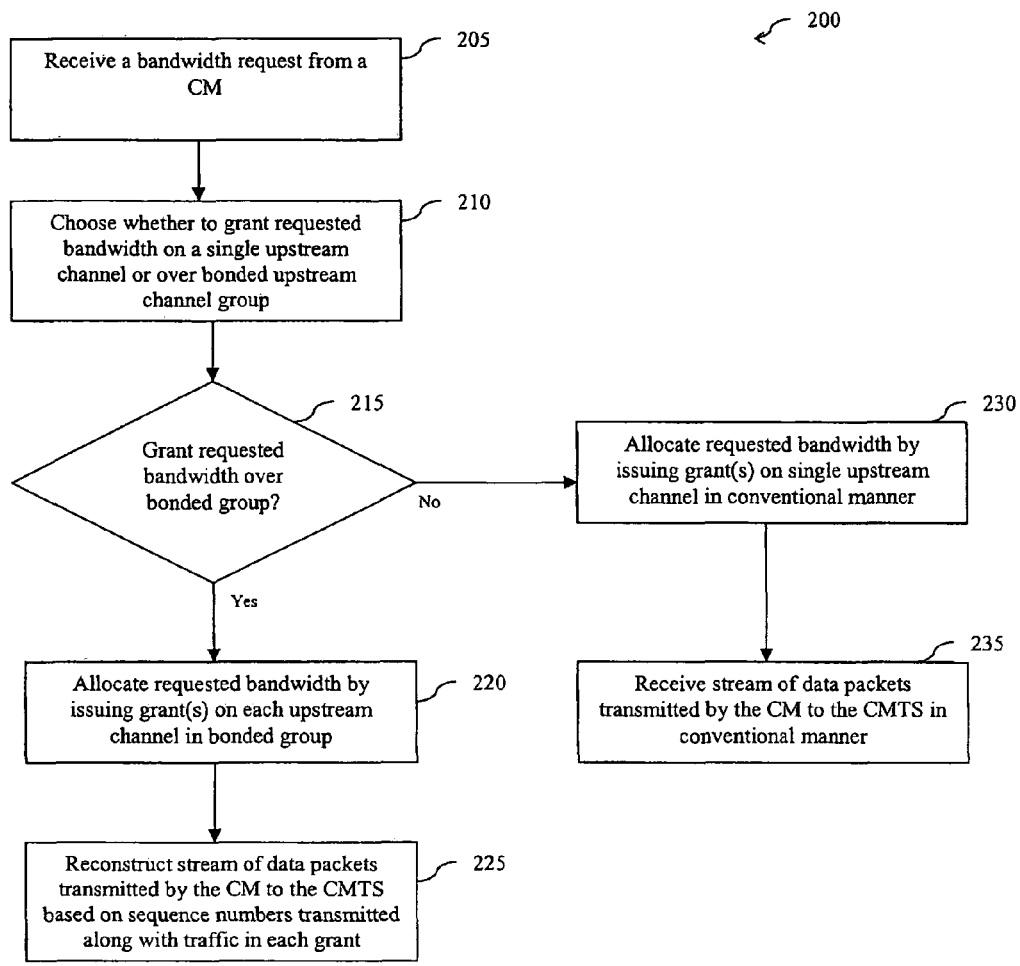
FIGS. 2-3 show process flowcharts providing example steps for high-throughput bandwidth allocation and transmission in a cable network, respectively, according to one or more embodiments of the present invention.

FIG. 2 shows a process flowchart 200 providing example high-level steps in a CMTS for high-throughput bandwidth allocation in a cable network, in accordance with an example embodiment of the present invention. The steps of process flowchart 200, as further described below, may be implemented in exemplary voice and data communications management system 100 of FIG. 1, wherein supervisory communications node 106 corresponds to a CMTS and remote communications node 102 corresponds to a CM.

The process begins at step 205, in which a CMTS receives a bandwidth request from a CM. The requested bandwidth is to be used by the CM in transmitting a stream of data packets to the CMTS. In step 210, the CMTS chooses whether to grant the bandwidth requested by the CM on a single upstream channel or over several upstream channels, which together belong to a bonded group. As shown at step 215, if the CMTS chooses to grant the requested bandwidth on a single upstream channel, then the process proceeds to step 230, in which the CMTS allocates the requested bandwidth by issuing one or more grants on a single upstream channel in a conventional manner. The CMTS then receives the stream of data packets as data transmitted by the CM to the CMTS during the grant(s), also in a conventional manner.

However, if in step 215, the CMTS chooses to grant the requested bandwidth over a bonded upstream channel group, then the process proceeds to step 220, in which the CMTS allocates the requested bandwidth by issuing one or more grants on each of the upstream channels in the bonded group. As will be described in more detail herein, this step involves issuing a separate MAP message for each of the upstream channels in the bonded group. During step 220, the CMTS may also include performing real-time load balancing with respect to the plurality of upstream channels in the bonded group. Then, at step 225, the CMTS reconstructs the stream of data packets transmitted by the CM based on sequence numbers embedded in the data, or traffic, transmitted in each grant across each channel in the bonded group. Note that with reference to FIG. 1, the function of bandwidth allocation as described herein is performed by BW allocation controller 128 within supervisory communications node 106.

Figure 3:
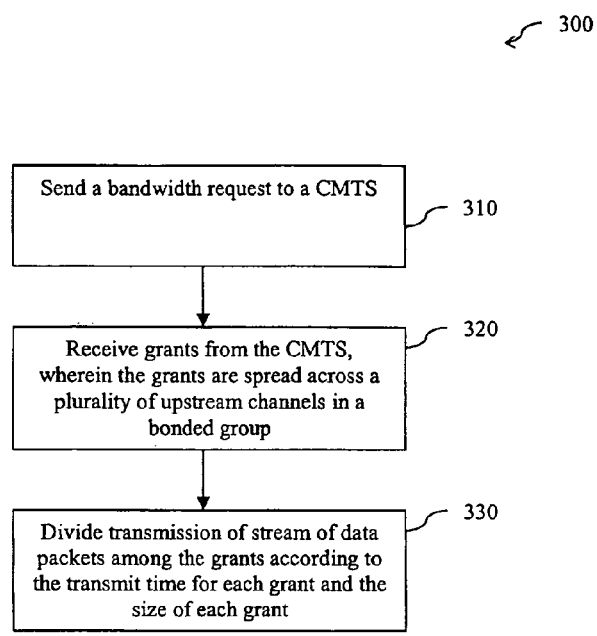

FIG. 3 shows a process flowchart 300 providing example high-level steps in a CM for high-throughput transmission in a cable network in accordance with an embodiment of the present invention. The steps of process flowchart 300, as further described below, may be implemented in the exemplary voice and data communications management system 100 of FIG. 1, wherein supervisory communications node 106 corresponds to a CMTS and remote communications node 102 corresponds to a CM.

The process begins at step 310, in which the CM sends a bandwidth request to a CMTS. The requested bandwidth is to be used by the CM in transmitting a stream of data packets to the CMTS. At step 320, the CM receives grants corresponding to the bandwidth request from the CMTS, wherein the grants are spread across a plurality of upstream channels that belong to a bonded group. As will be described in more detail herein, this step involves receiving a separate MAP message for each of the upstream channels in the bonded group. At step 330, the CM divides the transmission of the stream of data packets according to the transmit time for each grant and the size of each grant. Note that the grants may be staggered in time across any or all of the channels and may require the CM to transmit on all bonded upstream channels simultaneously. During this step, the CM places an incrementing sequence number in the traffic transmitted in each grant. These sequence numbers are used by the CMTS in reconstructing the original data stream.

1.3 Terminology

As described above, in an embodiment, the upstream channel bonding technique of the present invention is implemented as an extension of conventional DOCSIS interface specifications. Thus, several new terms are introduced below to describe upstream channel bonding interface specifications, which are extensions of conventional DOCSIS interface specifications.

As used herein, the term "Bonded Upstream Channel Descriptor (B-UCD)" describes a downstream message that specifies the channel identifiers contained in an upstream bonding group.

The term "segment" as used herein describes a bandwidth allocation, which may include the following characteristics: (1) allocated to particular SID (i.e., may be unicast, multicast, or broadcast); (2) consisting of contiguous minislots; and (3) using a specific interval usage code (IUC).

These and other new terms, which describe extensions of conventional DOCSIS interface specifications for implementing upstream channel bonding, are discussed in more detail in the sections that follow.

2. TRAFFIC SEGMENTATION 2.1 Segmentation Overview

As described above, upstream channel bonding is one way to achieve increased upstream throughput in a cable communications system. In an embodiment of the present invention, a CMTS controls the upstream channel bonding process as part of the bandwidth granting process, and decides how to segment the bandwidth based on the bandwidth requested by a CM and on the other traffic on the upstream channels.

The upstream channels within a bonded group may have very different physical layer characteristics. For example, one channel may support 160 kilosymbols per second (ksps) with Quadrature Phase Shift Key (QPSK) data regions and TDMA framing, while another may support 2.56 megasymbols per second (Msps) with 64 Quadrature Amplitude Modulation (QAM) data regions and S-CDMA framing. Centralized control allows the CMTS to perform real-time load balancing of the different upstream channels within the bonded group.

Figure 4:
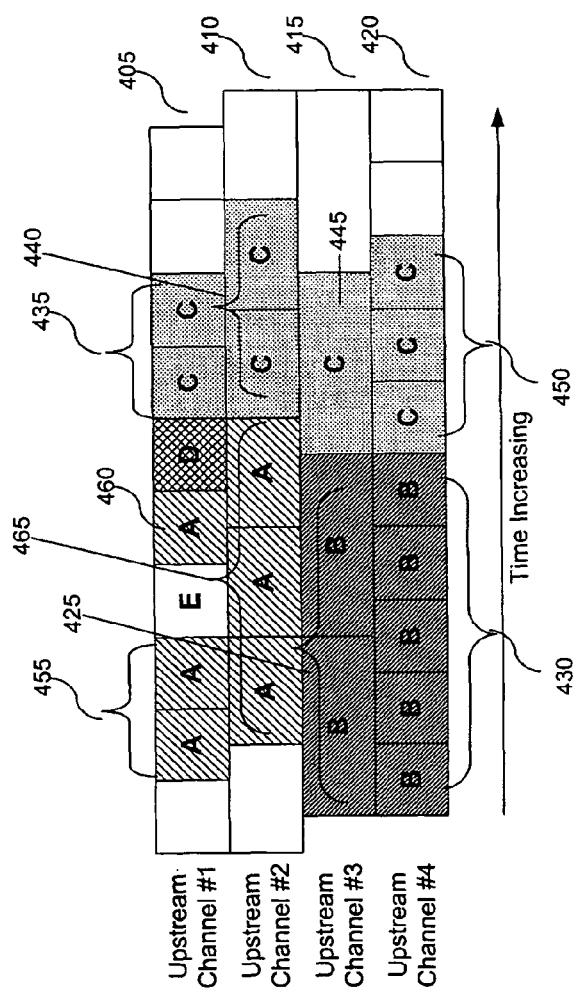
FIG. 4 illustrates an example traffic segmentation for four upstream channels with varying minislot sizes in accordance with an embodiment of the present invention.

FIG. 4 shows an example segmentation of four upstream channels 405, 410, 415 and 420 with varying minislot sizes, in accordance with an embodiment of the present invention. Each row 405, 410, 415 and 420 represents bandwidth across a single upstream channel. The vertical lines demarcate minislot boundaries. To minimize the amount of horizontal space required for FIG. 4, this example uses much shorter packets than are typically used in a conventional DOCSIS network. However, the vertical lines in this example can also represent a number of minislots rather than a single minislot.

The letters A-D within the blocks in FIG. 4 represent a service flow to which the CMTS has allocated the corresponding block of bandwidth. In this example, the CMTS chooses to grant service flow A's request by using bandwidth on channels 405 and 410 only. Similarly, the CMTS chooses to grant service flow B's request by using bandwidth on channels 415 and 420 only. The CMTS chooses to grant service flow C's request by using bandwidth spread across all four upstream channels 405, 410, 415 and 420. Blocks to service flow E and service flow D represent small grants to different unsolicited grant service (UGS) flows.

Each contiguous group of blocks/minislots assigned to the same service flow on the same channel in FIG. 4 represents a segment. Thus, the grant to service flow B consists of two segments 425 and 430, and the grant to service flow C consists of four segments 435, 440, 445 and 450. Since the grant to service flow A on channel 405 consists of two portions separated by the grant to service flow E, the overall grant to service flow A consists of three segments, segments 455 and 460 on channel 405 and segment 465 on channel 410. Each of these segments is treated like a conventional DOCSIS grant from the standpoint of physical layer overhead. Each segment will need a preamble at the beginning and guard time at the end. The physical layer properties of each segment are specified by the channel's physical parameters and the segment's IUC type.

2.2 Continuous Concatenation and Fragmentation

Having defined a general bandwidth segmentation structure, mechanisms for efficiently filling granted bandwidth segments are described below. In order to describe embodiments of the present invention for efficiently filling granted bandwidth segments, it is helpful to contrast these embodiments with conventional approaches. For example, one conventional approach for filling granted bandwidth segments is the conventional DOCSIS concatenation and fragmentation technique described below.

2.2.1 Conventional DOCSIS Concatenation and Fragmentation

With conventional DOCSIS systems, the CM decides whether it will send a single packet or a group of packets (i.e., a concatenation) upstream at a time and sends a request for the amount of bandwidth required to transmit the given traffic. The CMTS decides how it will grant the requested bandwidth and whether or not to allocate the bandwidth with a single grant or several grants spread over time. Should the CMTS decide to grant the request with a single grant, the CM transmits the traffic without any additional modifications. Should the CMTS decide to grant the request with several grants spread over time, the CM is forced to fragment the packet or concatenation of packets. The conventional DOCSIS method of fragmentation encapsulates each fragment with a fragment header and fragment cyclic redundancy code (CRC), adding a total of sixteen bytes of overhead to each fragment. With the conventional DOCSIS encapsulation technique, fragments look similar to non-fragmented DOCSIS frames, thereby allowing for more consistent functionality of the CMTS hardware.

Conventional DOCSIS systems require a handshaking of requests and grants so as to avoid unwanted fragmentation. Such fragmentation will occur if the CMTS sends a grant that is too small for the packet or concatenation of packets that the CM is trying to send upstream. To help the CM and CMTS stay aligned in the request/grant process, conventional DOCSIS systems use a convention that the CM can have only one request outstanding. The one request outstanding rule avoids some request/grant alignment issues. In one example, the one request outstanding rule avoids the following condition: a CM sends two requests, one for 100 minislots for packet A and another for 75 minislots for packet B, and the CMTS only receives the request for packet B due to contention. In another example, the one request outstanding rule avoids the following condition: the CMTS receives both requests for packets A and B, grants the requests in two separate DOCSIS MAP messages, and the first MAP message becomes lost due to a noise burst. While the one request outstanding rule avoids some request/grant alignment issues, it does not solve all of them.

Also, there are error conditions that happen routinely in the field that cause the CMTS and CM to get out of request/grant alignment. One example error condition is a CMTS that does not set its acknowledgement time accurately in each MAP or that improperly omits a grant pending for a SID whose request was considered but not granted. With an inaccurate acknowledgement time in the MAPs, there will be cases where a CM sends a request for a packet, thinks the request was lost due to the received acknowledgment time, and re-requests for the packet. Meanwhile, the CMTS grants the original request and later grants the re-request from the CM, while thinking the re-request is actually a new request for another packet. This sequence of events results in what appears to the CM to be an unsolicited grant. The CM will try to use this "unsolicited grant" for any packet that appears next in its queue and will fragment the packet if necessary. Depending on the timing of requests and grants, the system described above could remain out of request/grant alignment (caused by the extra grant) until the traffic flow for that SID stops.

In addition to the bandwidth wasted due to the fragmentation overhead, the conventional DOCSIS encapsulation method of fragmented concatenation also causes bandwidth inefficiencies due to the rules associated with sending fragments. Whenever a CM is transmitting a fragment and there is no grant pending in the MAP, the CM sends up a request for the bandwidth required to transmit the remainder of the packet, regardless of other packets that may have arrived in its queue. The CM cannot make requests for additional bandwidth for the new packets until the CM receives sufficient grants to transmit the remaining fragment. Additionally, any extra room in the last fragment for a grant cannot be used for other packets and the CM must insert padding to fill the wasted space.

Figure 5:
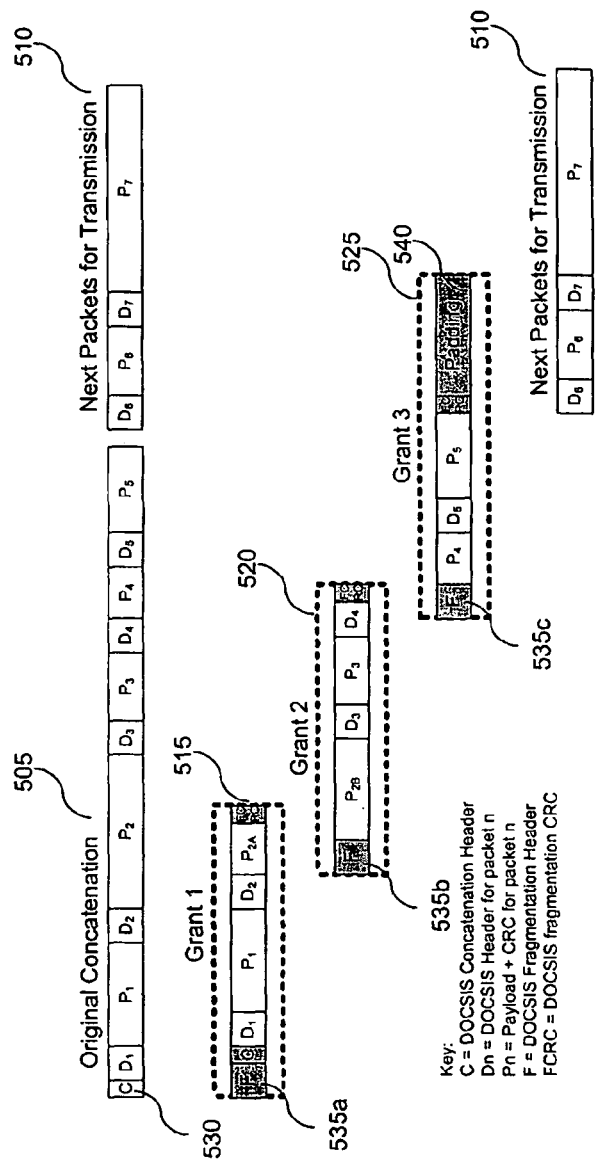
FIG. 5 illustrates an example of fragmented concatenation in accordance with a conventional DOCSIS implementation.

FIG. 5 illustrates an example of the conventional DOCSIS encapsulation method of fragmented concatenation. FIG. 5 shows an original concatenation of packets 505, for which a CM transmitted a request for bandwidth, and a queue 510 of next packets for transmission. The CM receives three grants 515, 520 and 525 and divides original concatenation 505 into the three grants for transmission. Each transmission 515, 520 and 525 includes a corresponding fragmentation header 535a, 535b and 535c. As shown in FIG. 5, a disadvantage of the DOCSIS encapsulation method of fragmented concatenation is that instead of filling third grant 525 with next packets for transmission from queue 510, the CM must pad out the grant with padding 540 to fill the wasted bandwidth.

Just as there are several cases where the conventional DOCSIS method of encapsulating fragments causes additional wasted bandwidth, a similar inefficiency occurs with conventional DOCSIS concatenation, which uses a concatenation header that contains the length of the entire concatenation. Thus, packets cannot later be added to a concatenation without changing the concatenation header. Should a grant arrive at the CM that is large enough to contain the concatenation plus an additional packet that arrives after transmission of the concatenation has begun, the CM cannot add the new packet to the concatenation.

For example, as shown in FIG. 5, original concatenation 505 includes a concatenation header 530 that contains the length of concatenation 505. Thus, instead of filling out third grant 525 with next packets for transmission from queue 510, the CM must pad out third grant 525 with padding 540. There are scenarios where changing the concatenation construction ad hoc would be useful, for example, when a concatenation is fragmented, when the PHY parameters and minislot size granularity result in excess unused bytes within a burst, and when the CM receives what it thinks is an unsolicited grant.

2.2.2 Continuous Concatenation and Fragmentation in Accordance with an Embodiment of the Present Invention In accordance with one or more embodiments of the present invention, a new mechanism, which allows for more efficient use of bandwidth when a request and grant do not match, is provided that has smaller overhead for fragments and allows the concatenation length to be changed after the beginning of the concatenation has been transmitted. This mechanism allows more efficient use of bandwidth when the grant size and packet boundaries do not align. One such mechanism is embodied in the concept of continuous concatenation and fragmentation (CCF). Unlike the conventional DOCSIS encapsulation approach, CCF employs a data-streaming type approach. Packets are inserted into granted bandwidth without using a concatenation header.

Figure 6:
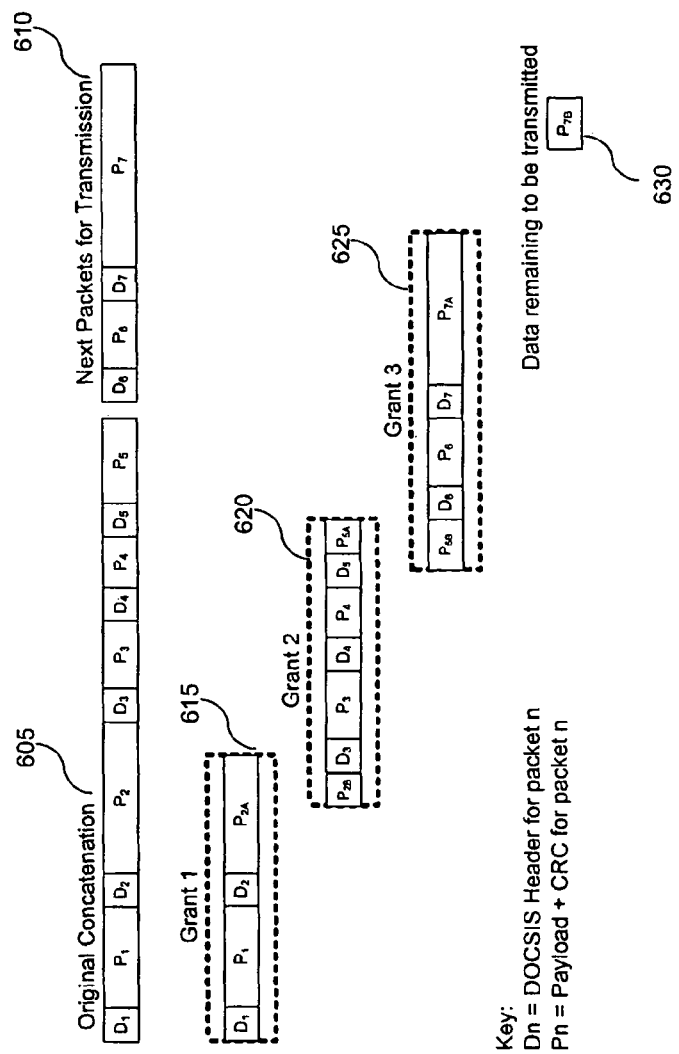
FIG. 6 illustrates an example of continuous concatenation and fragmentation in accordance with an embodiment of the present invention.

FIG. 6 illustrates an example implementation of CCF, in accordance with an embodiment of the present invention. FIG. 6 shows an original concatenation of packets 605, for which the CM transmitted a request for bandwidth, and a queue 610 of next packets for transmission. Unlike the approach shown in FIG. 5, the CM divides original concatenation 605 into three grants 615, 620 and 625, without the use of fragmentation headers. In this case, the CM fills third grant 625 with next packets for transmission from queue 610 so that no bandwidth is wasted.

In the conventional DOCSIS approach shown in FIG. 5, bandwidth is wasted because concatenation header 530 that contains the length of concatenation 505 is used. Instead of filling third grant 525 with next packets for transmission from queue 510, the CM must pad out third grant 525 with padding 540, leaving the entire queue 510 of packets to be transmitted. In the CCF approach of FIG. 6, no bandwidth is wasted because no concatenation header is used. Instead of padding, the CM can fill third grant 625 with next packets for transmission from queue 610, leaving only packet 630 to be transmitted.

In the example CCF implementation of FIG. 6, there is no way for the CMTS MAC layer to find packet boundaries within a set of grants once an upstream burst is lost due to noise. In the conventional DOCSIS downstream, an MPEG pointer is used to point to the beginning of a DOCSIS MAC header within the MPEG frame. In the upstream direction, by definition, the leading burst MAC boundary always lines up with the beginning of a packet, concatenation, or fragmentation header. With the example CCF implementation of FIG. 6, however, there is no way for the MAC layer to find the packet boundaries within grant 625 if the data in grant 620 is lost due to burst noise. Thus, an additional mechanism is desirable to demark DOCSIS frame boundaries for CCF.

In accordance with an embodiment of the present invention, an efficient mechanism for using CCF to fill granted bandwidth is to use segment headers that aid in reassembly. In one embodiment, the segment header contains a pointer to a first DOCSIS header within the segment. This pointer is similar to the MPEG pointer used in the conventional DOCSIS downstream for identifying packet boundaries. By using a fixed overhead for every segment, the CMTS can easily calculate how much additional bandwidth it must grant whenever it chooses to divide a grant into several smaller grants.

Figure 7:
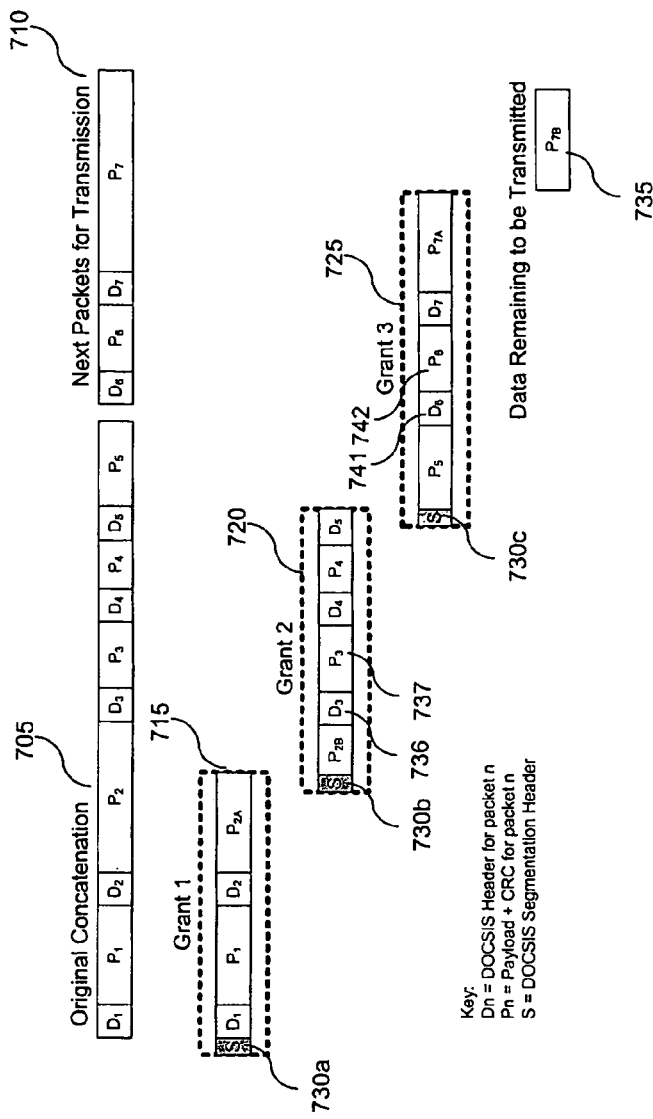
FIG. 7 illustrates an example of continuous concatenation and fragmentation using segment headers in accordance with an embodiment of the present invention.

FIG. 7 shows an example implementation of the CCF technique using segment headers, in accordance with an embodiment of the present invention. FIG. 7 shows original concatenation of packets 705, for which the CM transmitted a request for bandwidth, and queue 710 of next packets for transmission. In this case, the CM divides original concatenation of packets 705 into three grants 715, 720 and 725 using segment headers 730*a*, 730*b* and 730*c*, respectively, for transmission. Segment header 730*a* in grant 715 points to the first byte after segment header 730*a*. Segment header 730*b* in grant 720 points to a DOCSIS header 736 of a third packet 737. Segment header 730*c* in grant 725 points to a DOCSIS header 741 of a sixth packet 742. Thus, if any segment is lost, the CMTS can still find the packet boundaries in the remaining segments. The CMTS MAC uses the grant size to determine how many MAC bytes to extract from each grant. Whenever the CM runs out of data to send, it pads out the grant as it does in a conventional DOCSIS system.

An example segment header format is detailed herein in Section 7.2. In an embodiment, the segment header contains an optional piggyback field that the CM can use for requesting additional bandwidth. Example rules for using the optional piggyback field are detailed herein in Section 3.2.1.

The use of segment headers requires a relatively small overhead per segment and allows optimal use of the granted bandwidth. Without the segment headers, the CCF technique would have to prohibit packets from spanning segment boundaries, potentially wasting large portions of upstream bandwidth, or would have to accept the greatly increased bit error rate caused by the CMTS being unable to find MAC frame boundaries in the event of a lost segment.

Figure 8:
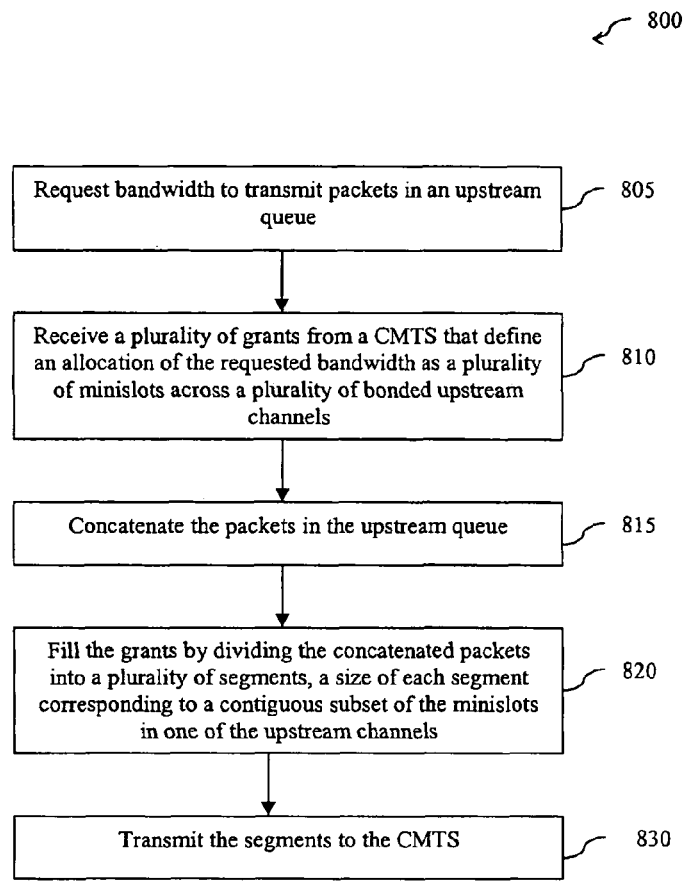
FIGS. 8-9 show process flowcharts providing example steps for continuous concatenation and traffic segmentation in accordance with one or more embodiments of the present invention.
Figure 9:
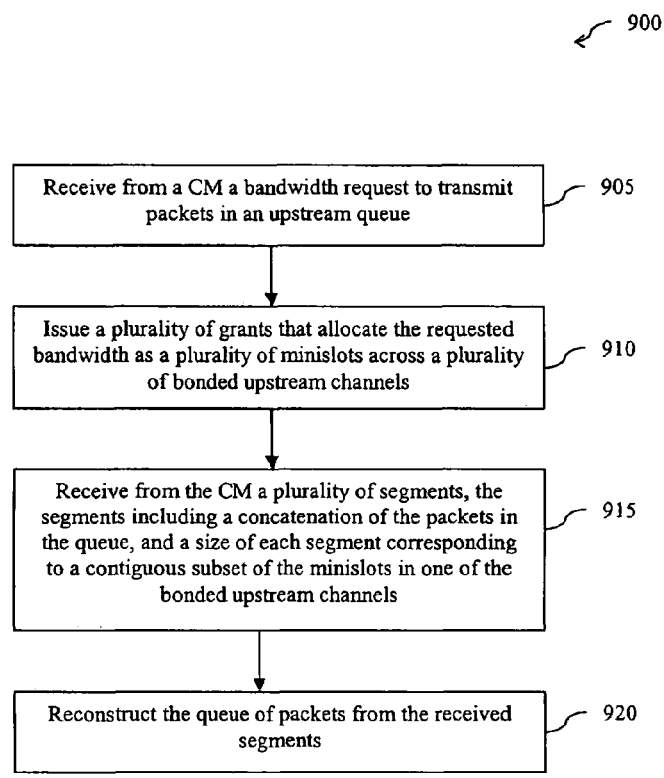
Figure 10:
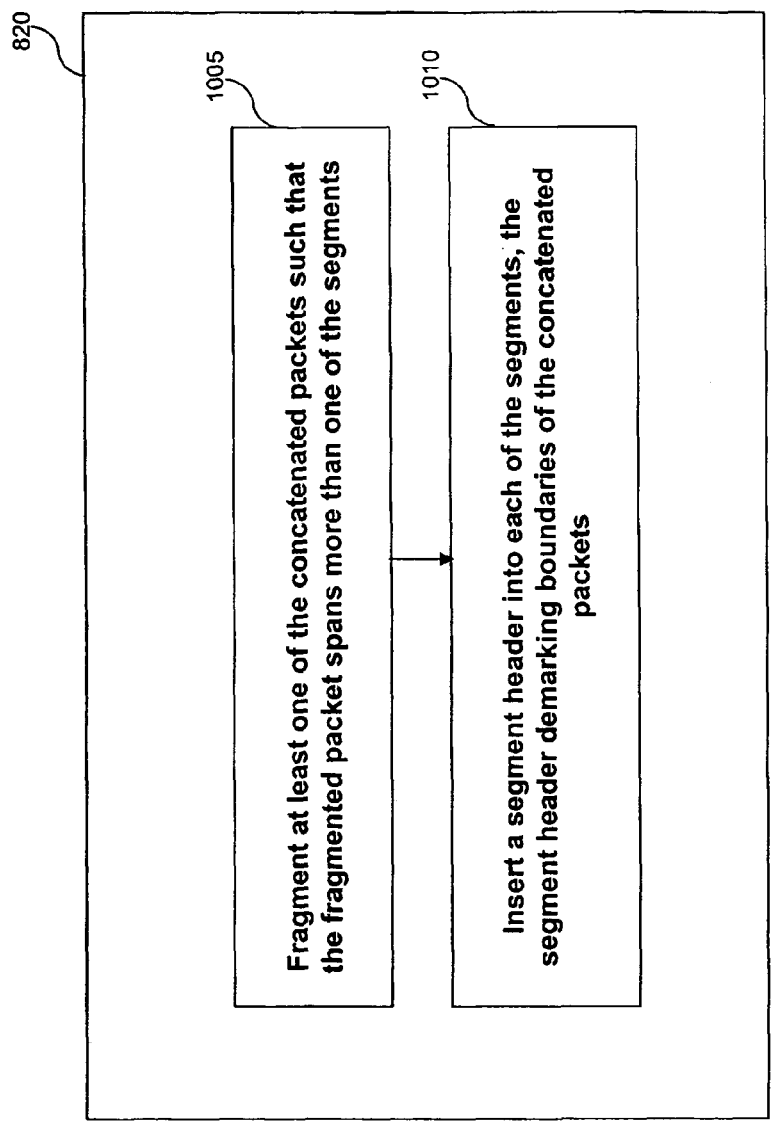
FIGS. 10-11 illustrate additional steps for implementing the processes of FIGS. 8-9 for fragmentation using segment headers in accordance with one or more embodiments of the present invention.
Figure 11:
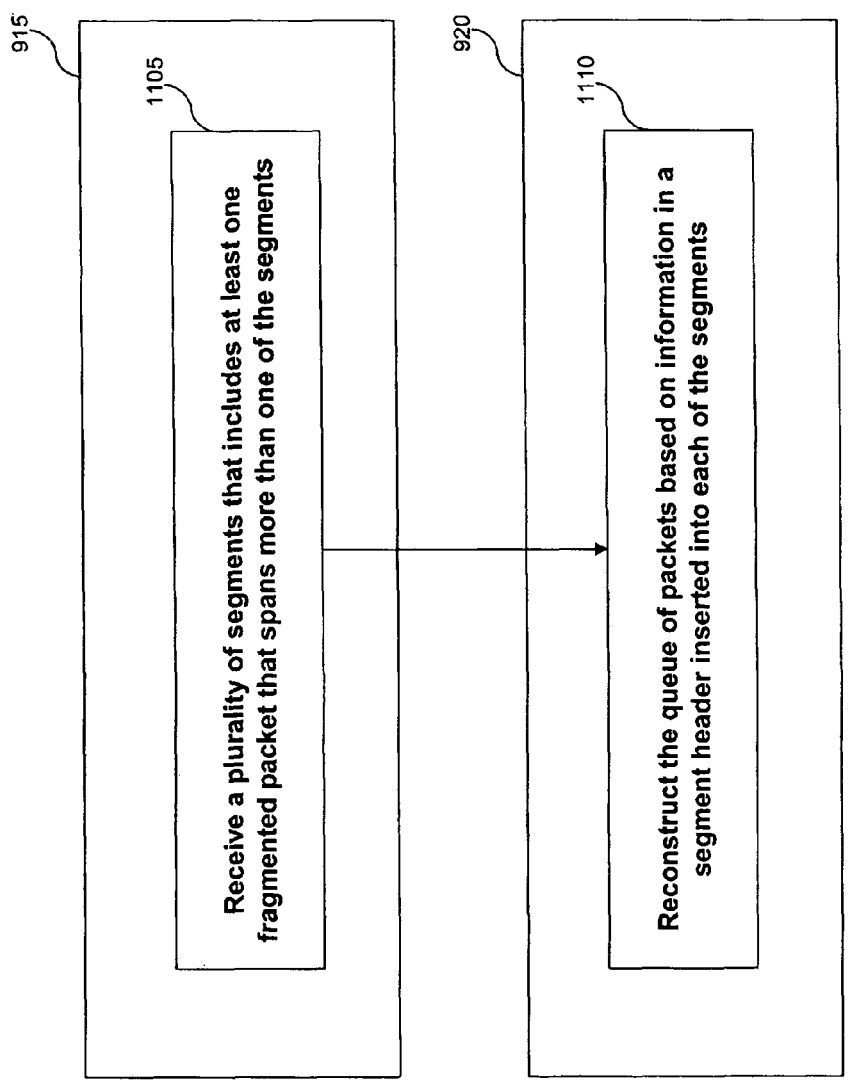

FIGS. 8-9 show process flowcharts providing example steps for continuous concatenation and traffic segmentation, in accordance with one or more embodiments of the present invention. FIGS. 10-11 illustrate additional steps for implementing the processes of FIGS. 8-9 for fragmentation using segment headers, in accordance with one or more embodiments of the present invention.

FIG. 8 shows a process flowchart 800 providing example steps in a CM for continuous concatenation and traffic segmentation. In step 805, the CM requests bandwidth to transmit packets in an upstream queue. In step 810, the CM receives a plurality of grants from a CMTS. The grants define an allocation of the requested bandwidth as a plurality of minislots across a plurality of bonded upstream channels.

In step 815, the CM concatenates the packets in the queue. In another embodiment, when the allocated bandwidth exceeds the requested bandwidth, the CM continuously concatenates the packets in the queue such that packets already in the queue are concatenated with newly arriving packets until the multichannel grant is filled. For example, FIG. 7 shows how the CM concatenates packets from original concatenation 705 with next packets for transmission from queue 710 to fill grant 725. In yet another embodiment, the CM pads out the grants with a fixed byte pattern (e.g., "FF" for upstream channel bonding") when the queue is empty.

In step 820, the CM fills the plurality of grants by dividing the concatenated packets into a plurality of segments. A size of each segment corresponds to a contiguous subset of the minislots in one of the upstream channels. The CM fills the grants with the concatenated packets without using DOCSIS concatenation headers. In step 825, the CM transmits the segments to the CMTS.

FIG. 10 shows additional steps that may be used to implement step 820 of FIG. 8 using fragmentation with segment headers. In step 1005, the CM fragments at least one of the concatenated packets such that the fragmented packet spans more than one of the segments. In step 1010, the CM inserts a segment header into each of the segments that assists in packet demarcation within the segment. For example, as shown in FIG. 7, the CM inserts segment headers 730*a*, 730*b* and 730*c* into grants 715, 720 and 725, respectively, for transmission. In another embodiment, the segment header includes a pointer to a location of a first DOCSIS header, if any, within that segment. For example, as shown in FIG. 7, segment header 730b points to first DOCSIS header 736 of segment 720. When there is no first DOCSIS header for the segment, such as for the middle segment(s) when a large packet spans more than two segments, a pointer valid bit in the segment header is cleared. In yet another embodiment, the segment header includes a fixed amount of overhead.

FIG. 9 shows a process flowchart 900 providing example steps in a CMTS for continuous concatenation and traffic segmentation. In step 905, the CMTS receives from a CM a bandwidth request to transmit packets in an upstream queue. In step 910, the CMTS issues a plurality of grants that allocate the requested bandwidth as a plurality of minislots across a plurality of bonded upstream channels. In step 915, the CMTS receives from the CM a plurality of segments. The segments include a concatenation of the packets in the queue, and a size of each segment corresponds to a contiguous subset of the minislots in one of the bonded upstream channels. In step 920, the CMTS reconstructs the queue of packets from the received segments.

FIG. 11 shows additional steps for implementing steps 915 and 920 of FIG. 9 using fragmentation with segment headers. In step 1105, the CMTS receives a plurality of segments that includes at least one fragmented packet that spans more than one of the segments. In step 1110, the CMTS reconstructs the queue of packets based on information in a segment header inserted into each of the segments. In an embodiment, the CMTS reconstructs the queue of packets based on a pointer in each segment header to a first DOCSIS header within a corresponding segment.

2.2.3 Segmentation without Segment Headers

Some service flows have unique properties in which the CMTS has advanced knowledge of transmission sizes without the CM making a request. In this case, the use of segmentation headers with CCF can be enabled and disabled on a service flow basis using the conventional DOCSIS Request/Transmission Policy in accordance with an embodiment of the present invention. The value of the Request/Transmission Policy will specify, among other parameters, whether segments headers are enabled or disabled for a particular service flow. For service flows with segmentation headers disabled, the CM can still use the concatenation portion of CCF, but is prohibited from using the fragmentation portion. Thus, all segments for service flows with segment headers disabled contain only complete packets or multiple complete packets. Should a segment be lost, the CMTS MAC will know that the next segment boundary aligns with a packet boundary and can continue processing the received packets.

The CMTS is prohibited from allocating bandwidth on more than one upstream channel for a service flow for which segments headers have been disabled. The reason for this restriction is that the packet ordering across channels cannot be guaranteed without segment headers.

When a service flow is provisioned for segment-header-off operation, the conventional DOCSIS baseline privacy interface extended header (BPI EHDR) with piggyback request or the conventional DOCSIS request extended header (EHDR) should be used for piggyback requesting. The EHDR field provides extensions to the MAC frame format and is used in conventional DOCSIS systems to implement data link security, as well as frame fragmentation, but can be extended to support additional functions, such as piggyback requesting when a service flow is provisioned for segment-header-off operation. The request fields in the EHDRs are not needed when segment headers are enabled because the segment header format allows for a piggyback request opportunity.

Note that the segment-header-off operation is intended for UGS flows and other types of flows for which the CMTS knows the amount of bandwidth needed to service the flow. As will be appreciated by persons skilled in the art, other uses of the segment-header-off operation (e.g., best effort) may be defined that necessitate enhancements to the Request/Transmission Policy and CM operational rules (thus, potentially impacting hardware design) in order to handle cases where the granted segment is smaller than the required amount.

Segment header-on/off operation is provisioned on a per-flow basis. UGS services can be configured for either segment header-on or segment header-off operation.

One justification for implementing segment-header-off operation is to minimize the overhead for UGS flows. With small packets, even an additional two bytes becomes a large overhead relative to the amount of data transmitted. By providing segment-header-off operation for UGS flows, an embodiment of the present invention minimizes the overhead for these small packets.

3. REQUESTING BANDWIDTH

In order to describe embodiments of the present invention for requesting bandwidth with upstream channel bonding, it is helpful to contrast these embodiments with conventional approaches. For example, the conventional DOCSIS request/grant mechanism allows the CM to request for either a single packet or a concatenation of packets for each of the upstream SIDs supported by the CM. Once the CM transmits a bandwidth request for a given SID, it must wait until it receives from the CMTS a grant (or grants) allocating that bandwidth before requesting additional bandwidth for the same SID. These restrictions (i.e., one request outstanding and one packet or concatenation at a time) attempt to prevent the CM and CMTS from getting out of request/grant alignment under most circumstances. With an upstream throughput potential of approximately 100 Mbps, it is desirable to modify the conventional DOCSIS request/grant mechanisms to allow the CM to request for a larger amount of bandwidth within a given timeframe.

One such modification for systems with upstream channel bonding is to allow a CM to request for all the packets it has ready for transmission given the QoS (Quality of Service) parameters associated with a particular SID. This approach is similar to the conventional DOCSIS approach of creating the maximum allowable concatenation, except that the limit would be much higher for some service flows than for conventional flows. Because, in general, the CM will be requesting much more bandwidth, it is desirable for the CM to request more bandwidth in a single request.

A conventional DOCSIS system allows a CM to request for packets it has ready for transmission using a burdened requesting approach. With burdened requesting, the CM requests in "burdened" minislots. Burdened requests include an estimation of the PHY overhead needed to transport a packet. In a conventional DOCSIS system, the calculation of PHY "burdening" is done by the CM before it sends its request. Burdened requesting is intended to ease calculations at the CMTS so that the CMTS can simply grant the requested bandwidth without having to do any overhead calculations. However, with the evolution of CMs being capable of transmitting simultaneously on multiple upstream channels having various PHY parameters, and CMTSs being capable of granting bandwidth to a given CM over multiple upstream channels, burdened requesting causes additional work for the CMTS. If burdened requesting is used for bonded upstream channel systems, the CMTS will have to perform reverse calculations to take out the PHY overhead in order to estimate the original payload size. Then the CMTS will have to divide the payload over the multiple upstream channels and calculate the PHY overhead associated with each partial grant.

In accordance with an embodiment of the present invention, a bonded upstream channel system allows a CM to request for packets it has ready for transmission using an unburdened requesting approach. With unburdened requesting, the CM requests bandwidth in "unburdened" bytes because the CM does not know over which channels the CMTS will choose to grant the requested bandwidth.

In an embodiment, the request field is expanded to include a length field of two bytes, with a granularity of four bytes, to allow the CM to request up to 256 kilobytes in a single request. Should the CM need to request more than 256 kilobytes for a particular service flow at a given time, it will have to wait until the first request is acknowledged prior to requesting the additional bandwidth. The 256 kilobyte request size maximum allows for MAP periods of up to 20 ms in duration and allows a single service flow to transmit up to 100 Mbps if so provisioned. In an embodiment, the granularity of the request size is programmable via a Bonded Upstream Channel Descriptor (B-UCD) message and can be programmed to other values besides the 4 bytes used to obtain a 256 Kbyte request size maximum.

3.1 Request Mechanisms

As described above, one mechanism for enabling larger upstream bandwidth requests is to allow a CM to request for all the upstream bandwidth it currently needs based on the packets it has ready for upstream transmission. This request mechanism allows the CM to send a bandwidth request to the CMTS based on queue depth, which includes all upstream packets and their known MAC headers. In accordance with an embodiment of the present invention, queue-depth based requesting must be used in conjunction with the CCF technique described above because the CMTS will not know individual packet boundaries and cannot grant fractions of a request without inadvertently crossing packet boundaries.

When requesting for queue depth, the CM takes into account all packets it wants to transmit and the amount of bandwidth required, which includes all known MAC-layer overhead. In one example embodiment, step 310 of FIG. 3 can be implemented with queue-depth based requesting, such that the CM sends a bandwidth request to the CMTS based on a depth of an upstream queue of the data packets. In another example embodiment, step 310 of FIG. 3 can be implemented with queue-depth based requesting, such that the bandwidth request includes bandwidth for MAC-layer overhead associated with the data packets in the upstream queue.

In accordance with an embodiment of the present invention, when requesting for queue depth, the CM does not include any estimation for segment header overhead because the CM does not know how many segments the CMTS may use to fragment the grant. Instead, the CMTS adds the necessary additional bandwidth to compensate for the segment headers when it sends the grant to the CM. In one example embodiment, the CM does not request for segment header overhead when fragmentation with segment headers is used in process 800, shown in FIG. 8. In this case, in step 805, the CM requests an unburdened amount of bandwidth to transmit packets in the upstream queue and, in step 810, the CM receives a plurality of grants from the CMTS that include an additional amount of bandwidth to accommodate a fixed amount of overhead associated with each of the segment headers. Similarly, in another example embodiment, the CMTS compensates for segment header overhead when fragmentation with segment headers is used in process 900, shown in FIG. 9. In this case, in step 910, the CMTS issues a plurality of grants that includes additional bandwidth to accommodate a fixed amount of overhead associated with each of the segment headers.

In accordance with an embodiment of the present invention, the CM sends a request for bandwidth for a given service flow on any upstream channel available to the CM. In an example embodiment, the CM sends a bandwidth request to the CMTS on an available upstream channel in step 305 of FIG. 3. The CMTS can choose to grant the bandwidth on the upstream channel upon which it received the request, on any other upstream channel associated with the CM, or on any combination of upstream channels associated with the CM.

In order to provide maximum flexibility in SID assignment on upstream channels, a system in accordance with an embodiment of the present invention identifies a group of SIDs consisting of one SID for each upstream channel within an upstream channel bonding group and that is treated the same from a request/grant perspective. Such a group is referred to herein as a "SID_Cluster". An example SID_Cluster is depicted in Table 1.

TABLE 1

| Example SID_Cluster | | | | |
|---|---|---|---|---|
| SID_Cluster | US #1 SID | US #2 SID | US #3 SID | US #4 SID |
| Cluster_0 | 58 | 479 | 85 | 1001 |

A SID_Cluster is assigned by the CMTS to a specific service flow on a CM. After such assignment, whenever the CM uses that service flow to make a request, it must use the SID specified by the SID_Cluster as appropriate for the upstream channel upon which it is transmitting the request. For example, with reference to the example SID_Cluster shown in Table 1, the CM associated with SID_Cluster 0 would use SID 479 when sending a bandwidth request on upstream channel no. 2 (US #2). Similarly, whenever the CMTS grants a request to a CM that is associated with a particular SID_Cluster, it must grant the request using the SID specified by the SID_Cluster as appropriate for the selected upstream channel. For example, with continued reference to the example of Table 1, if the CMTS chose to use upstream channel no. 3 (US #3) to grant the request from SID 479, the CMTS would place a grant to SID 85 in the MAP for upstream channel no. 3 (US #3).

In accordance with an embodiment of the present invention, the CMTS sends grants spread across channels using individual MAPs for each channel. Should the CMTS decide not to grant all of the bandwidth requested, the CMTS may send a conventional DOCSIS grant pending, which is a zero length grant that indicates that a request has been received and is pending, in the MAP messages until all received requests for that SID_Cluster are fulfilled. Alternatively, the CMTS may choose not to send grant pendings and allow the CM to re-request for the remainder of the bandwidth needed.

In accordance with an embodiment of the present invention, when the CM makes a bandwidth request, it must store the minislot count on the requesting channel (i.e., the upstream channel on which the CM sends the request) and the next closest minislot count on all other channels within the bonding group at the time of the request. The CM then looks for grants to the requesting SID_Cluster on all channels within the bonding group. Should the acknowledgment time in the MAPs for all channels within the bonding group exceed the time of the request and no grant pendings for the requesting SID_Cluster be present in any of those same MAPs, the CM is required to re-request for any ungranted portion of the original request. When the CM makes this re-request, it may include in the new request bandwidth for any new packets requiring transmission.

A CM is permitted to have multiple outstanding requests for a given SID_Cluster and may have more than one SID_Cluster assigned to a service flow when the service flow is provisioned. Once the CM transmits a bandwidth request for a service flow, the request/transmission policy for that flow controls whether or not the CM can make another request for that flow prior to receiving an acknowledgment in the form of a grant or grant pending. If the request/transmission policy prohibits making multiple outstanding requests in contention, the CM cannot request additional bandwidth in contention until it receives acknowledgment that the CMTS has received the bandwidth request. This acknowledgment may be in the form of a grant or grant pending. Once the CM receives acknowledgment, it may request for additional bandwidth, even though the CMTS has not fulfilled the previous request. The foregoing is illustrated by the following example, in which the CM requests 16 kBytes in its initial request. In response, the CMTS decides to grant the CM's request with 2 sets of grants of 8 kBytes each plus segmentation overhead with the two sets of grants being spaced out in time and appearing in separate MAPs. Once the CM receives the first grant, its request has been acknowledged and it may now request for any new packets that have arrived since the CM made the original request.

As noted above, in accordance with an embodiment of the present invention, more than one SID_Cluster may be assigned to a service flow. The Request Policy Parameters for the service flow determine when a CM switches between SID_Clusters. In an embodiment, the CM and CMTS are required to support at least 2 SID_Clusters per service flow. The CMTS is required to always grant using the same SID_Cluster as the request. The CM is required to stop requesting on a given SID_Cluster when any one of the following occurs: (1) a maximum number of outstanding requests per SID_Cluster is reached; (2) a maximum number of outstanding bytes per SID_Cluster is reached; (3) a maximum total bytes requested per SID_Cluster is reached; or (4) a maximum time in SID_Cluster is reached.

In accordance with an embodiment of the present invention, the CM is not permitted to request bandwidth for a given service flow by using more than one SID_Cluster at a time. The CM may switch to a different SID_Cluster at any time but is required to stop requesting with the current SID_Cluster under the conditions given above. Once a CM has stopped using a particular SID_Cluster, that SID_Cluster is not allowed to be used for requesting bandwidth again until all remaining bandwidth requests for that SID_Cluster have been satisfied. Should the acknowledgment times exceed the requesting time on all channels within the bonding group and there are no grant pendings present in the current MAPs, if the request is still unfulfilled, the CM then re-requests for any ungranted bandwidth on that SID_Cluster using any of the SID_Clusters available for requesting.

Because the CMTS may use multiple sets of grants to grant the bandwidth from a single request, situations may arise where the CM and CMTS are temporarily out of alignment as requests are lost due to upstream burst errors and collisions, and MAPs are lost due to downstream errors. In accordance with an embodiment of the present invention, the CM must use the acknowledgment time of a request to determine if the CMTS should have received the request before deciding to re-request. Whenever the CM receives a grant pending for the requesting SID_Cluster in a MAP on any channel within the upstream bonding group, the CM is not permitted to re-request for bandwidth for this SID_Cluster. Depending on the Request Policy Parameters for the service flow, the CM may be able to request for new bandwidth ready for upstream transmission for the service flow. Once the CM receives MAPs on all channels within the bonding group with the MAPs containing no grant pendings for a given SID_Cluster, and depending on the Request Policy Parameters, the CM may re-request using piggyback opportunities or contention opportunities for any untransmitted packets whose request time is earlier than the acknowledgment time in the current MAPs. Note that requests whose request time is later than the acknowledgment may still be in-transit or awaiting processing by the CMTS. The CM is required to wait for the acknowledgment time to be past the requesting time on all channels within the bonding group before determining if a re-request is needed. This requirement allows independent operation of CMTS upstream channel schedulers.

As an example of operation during a lost MAP, consider a CM sending a request for 16 Kbytes in its initial request. The CMTS receives the request and sends a set of MAPs (one MAP message for each upstream channel) containing a set of grants for that CM. One of the MAPs is corrupted due to burst noise so the CM discards the MAP message. Meanwhile, the CM receives uncorrupted MAPs for the other upstream channels. The CM transmits according to the grants in the correctly-received MAPs. Because the CM has not received a MAP for one of the channels with that MAP containing an acknowledgment time past the time of request, the CM is unable at this point to determine if all of its requests will be granted. The next set of MAPs arrives, and the CM sees that the acknowledgment time on all channels is past the time of request and there are not grant pendings for the requesting SID_Cluster. The CM knows from this that the CMTS has no outstanding requests for this SID_Cluster. However, the CM still has data to be sent from the original 16 Kbyte request. The CM sends a new request for the remainder of the 16 Kbytes plus any new traffic that is ready to be sent upstream for that service flow.

3.2 Piggyback Requesting

Piggyback requesting refers to the use of bandwidth in a unicast data allocation for requesting additional bandwidth. The request, in effect, "piggybacks" on top of a data transmission. In an embodiment of the present invention, rules for when a CM can piggyback a request for a given service flow vary slightly based on whether or not segment headers are being used with CCF. Segment header use is provisioned on a per-service flow basis. Example rules for piggyback requesting with segment headers on and with segment headers off are presented below.

3.2.1 Example Rules for Piggyback Requesting with Segment Headers On

Piggyback requesting is performed on a per-service flow basis such that the CM can only piggyback a request for bandwidth required for the same service flow for which it is transmitting data.

When a grant pending for the requesting SID_Cluster occurs in a MAP for any channel within the upstream bonding group, the CM is not permitted to request bandwidth for packets for which it previously sent requests using this SID_Cluster. The CM may piggyback request for packets for which it has not previously sent a request using this SID_Cluster.

When the CM receives for every channel within the upstream bonding group a MAP without a grant pending for the requesting SID_Cluster, the CM can re-request for previously requested bandwidth, when the request time is earlier than the acknowledgment time in the MAP for all channels in the bonding group. The CM may also include in this request the bandwidth for any newly arrived packets.

Figure 12:
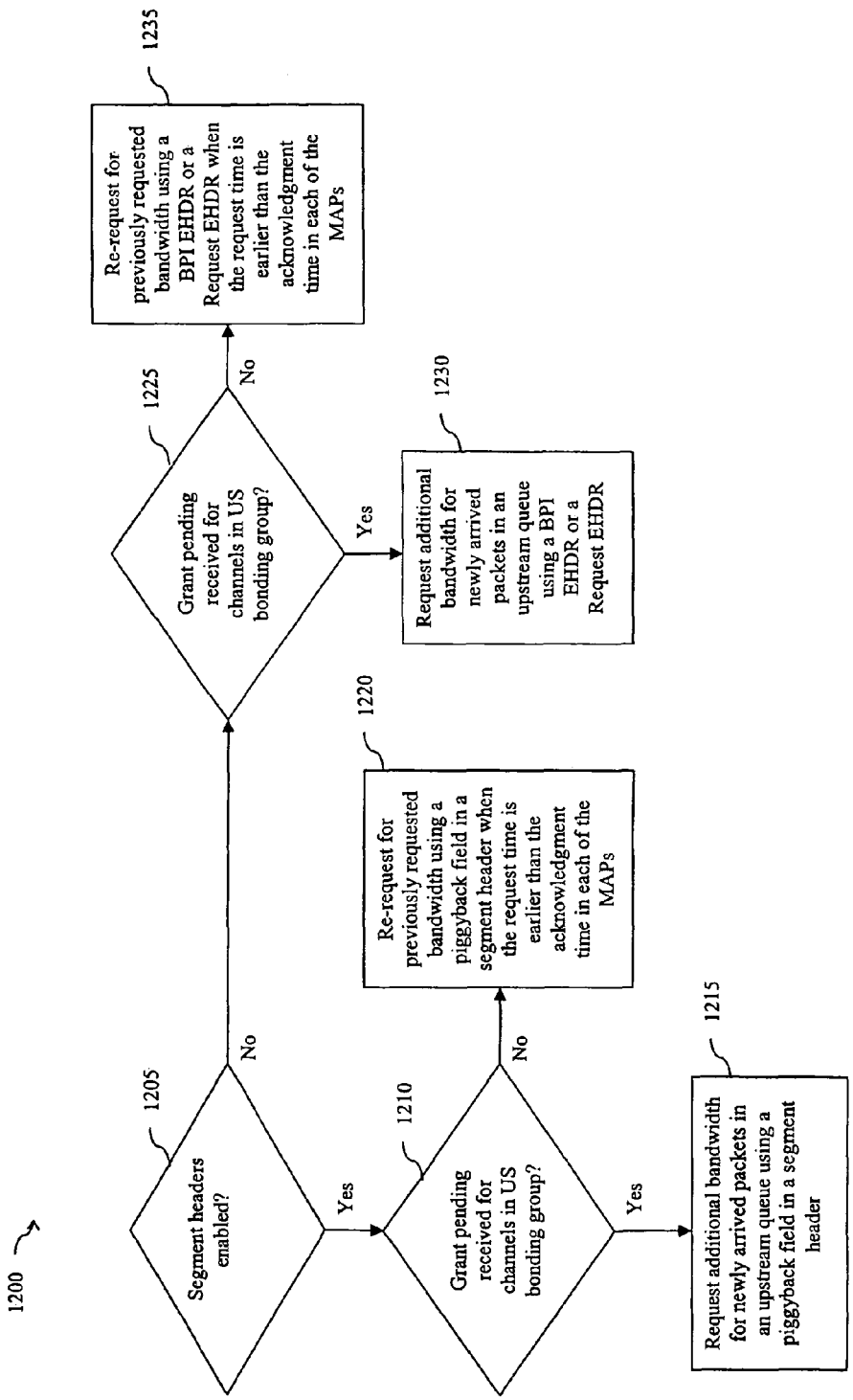
FIG. 12 shows a process flowchart providing example steps for piggyback requesting with segment headers in accordance with an embodiment of the present invention.

FIG. 12 shows a process flowchart 1200 providing example steps in a CM for piggyback requesting with segment headers, in accordance with an embodiment of the present invention. This process assumes that the CM has previously transmitted to the CMTS a bandwidth request for a given SID_Cluster associated with a particular upstream bonding group.

The process of flowchart 1200 begins at decision step 1205. If, in step 1205, segment headers are enabled, then process 1200 proceeds to decision step 1210. In accordance with decision step 1210, if a MAP is received from the CMTS that includes a grant pending for a channel in the upstream bonding group, then, in step 1215, the CM requests additional bandwidth for newly arrived packets only in an upstream queue using a piggyback field in a segment header. If, however, a MAP without a grant pending is received from the CMTS for each channel in the upstream bonding group, then, in step 1220, the CM re-requests for previously requested bandwidth using the piggyback field in the segment header provided that the request time is earlier than the acknowledgment time in each of the MAPs. In another embodiment, in step 1220, the CM also requests bandwidth for any newly arrived packets in the upstream queue using the piggyback field in the segment header.

3.2.2 Example Rules for Piggyback Requesting with Segment Headers Off

When segment headers are disabled for a service flow, the CM can use BPI EHDRs or Request EHDRs to send piggyback requests. The CM must assume the use of a BPI EHDR or Request EHDR when it sends a request for the original data on which it wants to send a piggyback request.

When a grant pending for the requesting SID_Cluster occurs in the MAP for any channel within the upstream bonding group, the CM is not permitted to request bandwidth for packets for which a request was previously sent using this SID_Cluster. The CM may piggyback requests for packets for which it has not previously sent a request.

When the CM receives for every channel within the upstream bonding group a MAP without a grant pending for the requesting SID_Cluster, the CM may re-request for previously requested bandwidth provided that the request time is earlier than the acknowledgment time in the MAP on every channel within the upstream bonding group. The CM may also include in this request the bandwidth for any newly arrived packets.

Referring again to FIG. 12, process 1200 illustrates example steps in a CM for piggyback requesting when segment headers are disabled, in accordance with an embodiment of the present invention. This process assumes that the CM has previously transmitted to the CMTS a bandwidth request for a given SID_Cluster associated with a particular upstream bonding group.

The process begins at decision step 1205. If, in step 1205, segment headers are not enabled, then process 1200 proceeds to decision step 1225. In accordance with decision step 1225, if a MAP is received from the CMTS that includes a grant pending for a channel in the upstream bonding group, then, in step 1230, the CM requests additional bandwidth for newly arrived packets only in an upstream queue using a BPI EHDR or a Request EHDR. If, however, a MAP without a grant pending is received from the CMTS for each channel in the upstream bonding group, then, in step 1235, the CM re-requests for previously requested bandwidth using the BPI EHDR or Request EHDR when the request time is earlier than the acknowledgment time in each of the MAPs. In another embodiment, in step 1235, the CM also requests bandwidth for any newly arrived packets using the BPI EHDR or Request EHDR.

3.3 Contention Requesting

In accordance with an embodiment of the present invention, contention requesting is enabled for bonded upstream channel systems. Contention requesting on bonded channels is similar to contention requesting on conventional DOCSIS unbonded channels. Each of the upstream channels in the bonding group is assigned a number within the group. The CM counts request opportunities in time-order across the channels. When the start times of request opportunities on two or more upstream channels align, it is up to the CM's discretion to pick the ordering of those opportunities as long as all opportunities are counted against the CM's randomly selected backoff value, which defines how many request opportunities the CM must let pass before making its request.

In accordance with an embodiment of the present invention, the CMTS must allocate request opportunities in multiples of the number of minislots required to transmit a request on a given channel, because counting request opportunities across channels is more difficult for a CM than counting them across a single upstream channel. For example, if a channel requires two minislots per request, then the CMTS must allocate request regions in multiples of two minislots (e.g., a request region of five minislots would not be permitted on this channel). Note, that in conventional DOCSIS systems, the CMTS is not prohibited from allocating improperly sized request regions.

When counting request retries for modifying the backoff windows, the CM must only count requests sent in contention regions. Thus, requests sent in piggyback mode and lost due to noise will not impact the backoff window used by the CM for sending contention requests.

Figure 13:
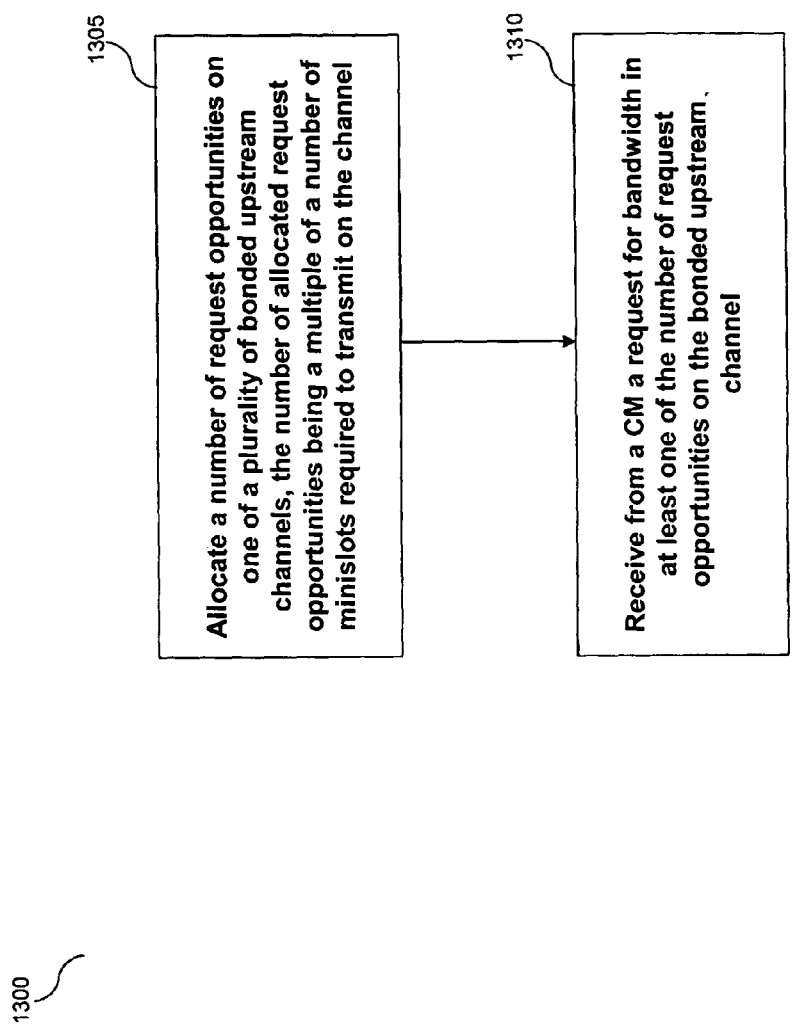
FIG. 13 shows a process flowchart providing example steps for contention requesting with bonded upstream channels in accordance with an embodiment of the present invention.

FIG. 13 shows a process flowchart 1300 providing example steps for contention requesting with bonded upstream channels, in accordance with an embodiment of the present invention. In step 1305, a CMTS allocates a number of request opportunities on one of a plurality of bonded upstream channels, the number of allocated request opportunities being a multiple of a number of minislots required to transmit on the channel. In step 1310, the CMTS receives from a CM a request for bandwidth in at least one of the request opportunities on the bonded upstream channel.

3.3.1 Impacts on Legacy Contention Retry Accounting

The DOCSIS 2.0 specification specifies that if the CM retries contention requesting unsuccessfully 16 times, the CM should discard the packet or concatenation for which the CM was requesting and begin the request process again with the next packet or concatenation for that service flow. With multiple outstanding requests and continuous concatenation and fragmentation in accordance with an embodiment of the present invention, a different definition for the retry threshold is needed. For CMs operating in accordance with the present invention, the "request retries" parameter is redefined as "the number of consecutive contention retries for bandwidth allocation requests for a given service flow." The "Contention Resolution Overview" section of the DOCSIS 2.0 specification contains the following requirement: "This re-try process continues until the maximum number of retries (16) has been reached, at which time the PDU MUST be discarded." In accordance with an embodiment of the present invention, this requirement changes to "This re-try process continues until the maximum number of contiguous contention retries (16) has been reached, at which time the CM discards from the head of the upstream transmit queue those packets corresponding to the last request transmitted for the service flow."

4. GRANTING BANDWIDTH

In accordance with an embodiment of the present invention, a CMTS scheduler allocates bandwidth on individual channels based on the available bandwidth on all of the upstream channels in a bonding group. Requests made on any individual channel can be allocated bandwidth on any combination of upstream channels within the bonding group associated with the requesting service flow. In this manner, the CMTS can perform real-time load balancing of the upstream channels. Similarly, the CMTS can consider the physical layer parameters on each of the upstream channels and the requested number of bytes to determine optimal allocations across channels.

In accordance with an embodiment of the present invention, the CMTS uses conventional DOCSIS MAP messages to send grants to the CM. Because the upstream parameters of each channel may be very different from each other, the allocation start times of the MAPs may be different from each other as well. Because the allocation start times and acknowledgment times may vary widely, a CM in accordance with an embodiment of the present invention must wait until acknowledgment time for all upstream channels is past the time of request before determining if a re-request is necessary.

In accordance with a conventional DOCSIS system, the CMTSs may ignore part or all of a request. Ignoring a request from a CM implementing the present invention could result in additional performance degradation (relative to legacy systems) because the CM implementing the present invention may take longer to detect lost requests if there are multiple outstanding requests.

In accordance with an embodiment of the present invention, a CMTS is required to be capable of granting bandwidth on any channel within an upstream bonding group, regardless of on which channel a bandwidth request was received.

5. BASELINE PRIVACY IMPACT

The conventional DOCSIS Baseline Privacy Interface (BPI) is a set of extended services within the DOCSIS MAC layer for encrypting traffic flows between a CMTS and a CM to give subscribers data privacy across an RF network. In order to describe embodiments of the present invention for traffic encryption for bonded upstream channels, it is helpful to contrast these embodiments with conventional approaches.

5.1 Conventional DOCSIS Traffic Encryption

Figure 14:
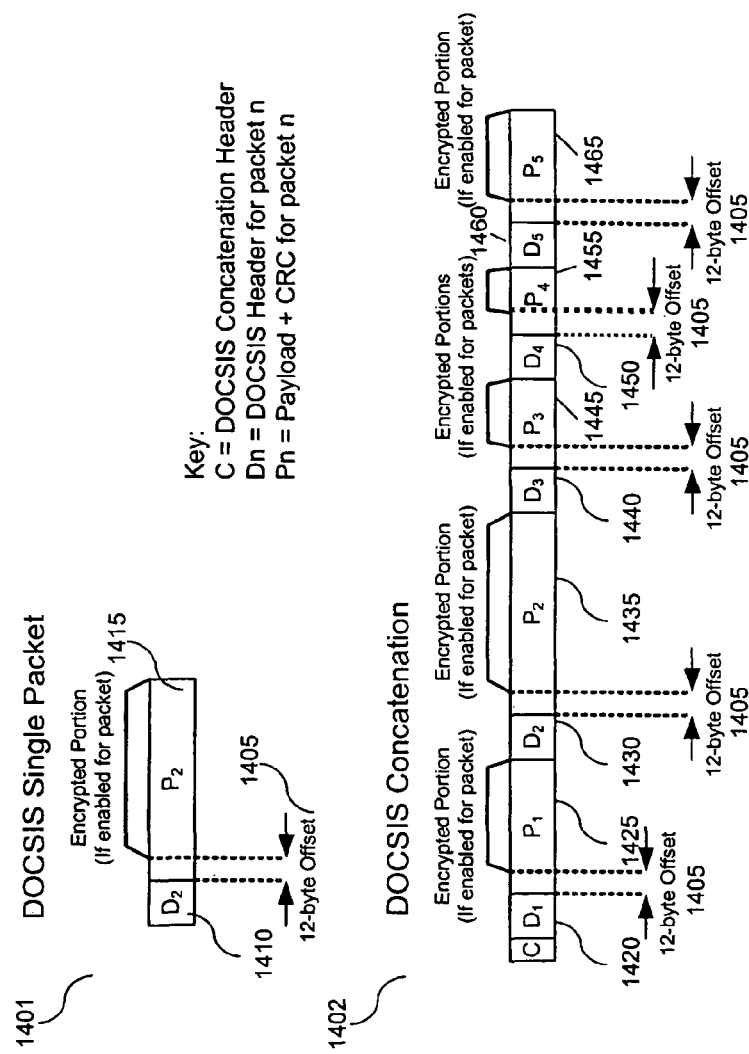
FIG. 14 illustrates an example of a conventional DOCSIS traffic encryption technique with 12-byte offset for an unfragmented single packet and an unfragmented concatenation of packets.
Figure 15:
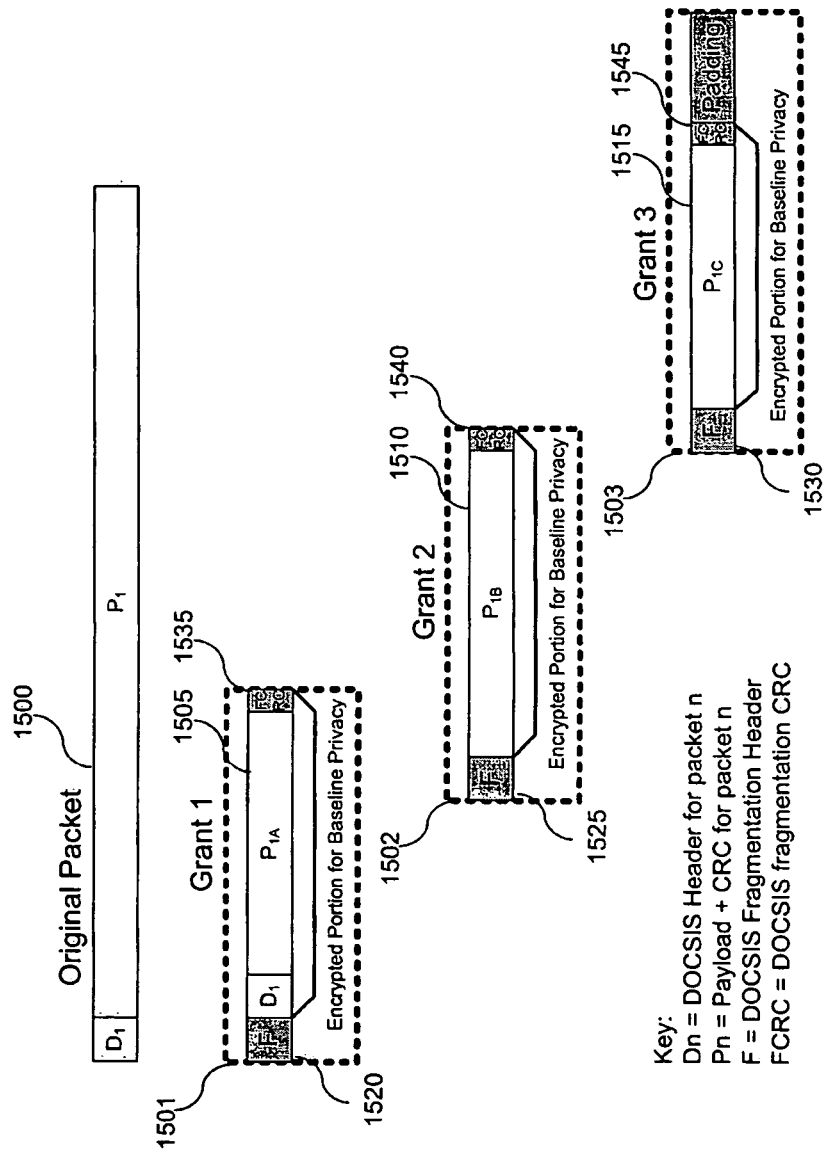
FIG. 15 illustrates an example of a conventional DOCSIS traffic encryption technique for a fragmented single packet.
Figure 16:
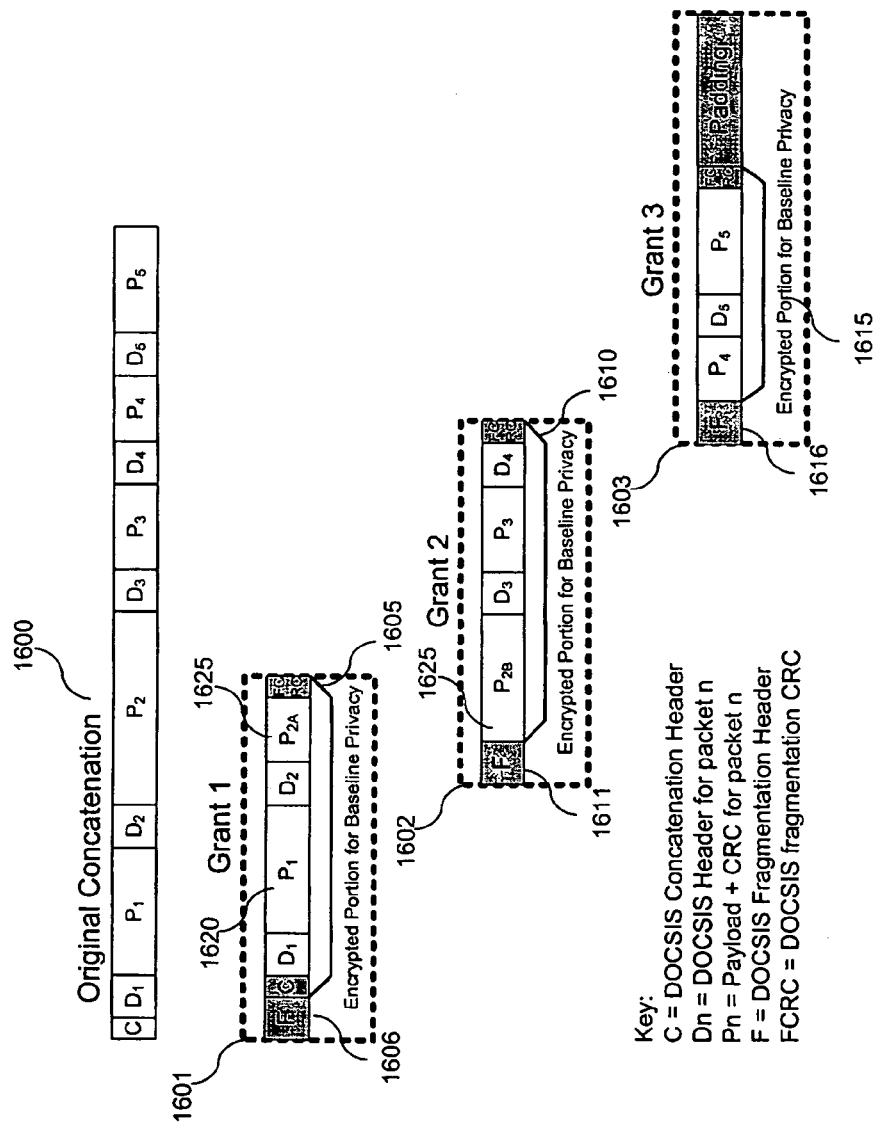
FIG. 16 illustrates an example of a conventional DOCSIS traffic encryption technique for a fragmented concatenation of packets.

Conventional DOCSIS systems handle traffic encryption in two different ways depending on whether the traffic is fragmented at the DOCSIS MAC layer. FIGS. 14-16, described in detail below, illustrate example conventional DOCSIS traffic encryption techniques.

For unfragmented single MAC frame transmissions that require encryption, the frame is encrypted from twelve bytes after the DOCSIS MAC header through the CRC of the packet. This 12-byte offset allows the receiving entity to filter on the Destination Address/Source Address (DA/SA) combination (when Payload Header Suppression (PHS) is not used) prior to decryption. This 12-byte offset also allows for a stronger cipher because the frequently occurring strings of destination address and source address are left visible so as not to give hackers hints for deciphering.

For unfragmented concatenations, each MAC frame within the concatenation is treated like an unfragmented single MAC frame. Mixtures of unencrypted and encrypted frames may appear within a concatenation. This mixture can occur whenever MAC management messages (which are not supposed to be encrypted) are included in a concatenation with encrypted data. FIG. 14 illustrates an example of conventional DOCSIS traffic encryption with 12-byte offset for an unfragmented single packet 1401 and an unfragmented concatenation of packets 1402. As shown in FIG. 14, unfragmented single packet 1401 includes an encrypted payload 1415 following a 12-byte offset 1405 from a corresponding unencrypted DOCSIS MAC header 1410 through the CRC of the packet. Similarly, each frame of concatenation of packets 1402 includes an encrypted payload portion 1425, 1435, 1445, 1455 and 1465 following the 12-byte offset 1405 from a corresponding unencrypted DOCSIS MAC header 1420, 1430, 1440, 1450 and 1460 through the CRC of each packet.

Fragmented single frames and fragmented concatenations are treated differently from their unfragmented forms. FIG. 15 illustrates an example of conventional DOCSIS traffic encryption for a fragmented single packet 1500. Original packet 1500 is fragmented across three grants 1501, 1502 and 1503. Each packet fragment 1505, 1510 and 1515 is encapsulated with a corresponding fragment header 1520, 1525 and 1530 and a corresponding fragment CRC 1535, 1540 and 1545. As shown in FIG. 15, each fragment 1505, 1510 and 1515 is encrypted from the end of the corresponding fragment header through the corresponding fragment CRC.

Because fragment boundaries will rarely align with packet boundaries within a concatenation, concatenations of packets are treated as a large single MAC frame from a conventional DOCSIS traffic encryption perspective. Thus, for a fragmented concatenation of packets, each concatenation fragment is encapsulated with a fragmentation header and a fragmentation CRC. Encryption is then performed on the fragment from the end of the fragment header through the fragment CRC. The 12-byte offset used for unfragmented frames is not used with fragmented frames because the 12-bytes would be user data rather than a DA/SA pair.

FIG. 16 illustrates an example of conventional DOCSIS traffic encryption for a fragmented concatenation of packets 1600. Concatenation of packets 1600 is fragmented over three grants 1601, 1602 and 1603 into three fragments 1605, 1610 and 1615 having corresponding fragment headers 1606, 1611 and 1616. Note that all packets within fragments 1605, 1610 and 1615 are encrypted the same way (i.e., encryption is performed on each fragment from the end of the corresponding fragment header through the corresponding fragment CRC).

Referring to FIG. 16, if a first packet 1620 in grant 1601 is supposed to be encrypted but a second packet 1625 is not supposed to be encrypted, both packets will be encrypted. Thus, if concatenation 1600 were to contain a BPI key exchange message and be fragmented, the BPI key exchange message would be encrypted within one or more fragments 1605 and 1610. If the key exchange message is encrypted and the key used is incorrect, the CMTS will not be able to decrypt the message containing the new key. For this reason, conventional DOCSIS traffic encryption prohibits the CM from including BPI key exchange messages within a concatenation.

5.2 Traffic Encryption for Bonded Upstream Channels

For bonded upstream channel systems, the CMTS decides how to segment the bandwidth over the upstream channels and does not know a priori what type of packets the CM will transmit in a given segment. Thus, there is no way to ensure that BPI key exchange messages have their own segments unless additional mechanisms are added to the conventional DOCSIS protocol for bonded upstream channel systems.

Rather than adding mechanisms to the protocol, the following approaches can be used to avoid encryption of BPI key exchange messages for bonded upstream channel systems: (1) BPI encryption can be performed on a segment basis, or (2) a secondary service flow can be dedicated to every CM implementing upstream channel bonding for sending BPI key exchange messages, or (3) BPI encryption can be performed on a protocol data unit (PDU) basis prior to segmentation. These three approaches are described in more detail below.

5.2.1 CM Forcing Single Packet Transmission

One mechanism for avoiding encryption of BPI key exchange messages for bonded upstream channel systems is to encrypt on a segment basis, but always force a BPI key exchange message to be the only packet within a segment. This approach requires that the segment header for all segments requiring BPI include a BPI header. This approach also requires that the CM have an intelligent requesting agent and be able to stall the request engine surrounding BPI key exchange messages.

For example, consider the packet ordering shown in Table 2. Assume that Table 2 shows a current list of packets enqueued for upstream transmission on a particular service flow at a CM. To prevent the BPI key exchange message in the fifth packet from being included with other packets in a segment, the CM first sends up a request for only the first four packets in the queue. Once the CM receives grants for the first four packets, the CM sends up a request for only the fifth packet. The CM then waits again for the grants to fulfill transmission of the fifth packet before requesting bandwidth for the sixth and seventh packets and any other packets that have been enqueued in the meantime. This approach is less efficient than sending one request for all seven packets in the example queue of packets shown below in Table 2.

TABLE 2

Example of Packets in CM Queue

| Packet Number in Queue | Type of Packet |
| --- | --- |
| 1 | User Data |
| 2 | User Data |
| 3 | SNMP Response |
| 4 | User Data (Ack) |
| 5 | BPI Key Exchange Message |
| 6 | User Data (Ack) |
| 7 | User Data |

5.2.2 Using Dedicated Service Flow with BPI Disabled

Another mechanism to avoid encrypting BPI key exchange messages for bonded upstream channel systems is to dedicate a secondary service flow to every CM implementing upstream channel bonding to be used only for BPI key exchange messages and for other messages not requiring encryption. In this approach, the CM uses a BPI-OFF service flow whenever requesting bandwidth for sending BPI key exchange messages. While this approach avoids the problem of encrypting BPI key exchange messages, it requires an additional service flow at every CM. Adding additional service flows may not be desirable to Cable Operators trying to conserve service flows due to the added number of DOCSIS devices with DOCSIS set-top gateway (DSG) usage for set-top box control.

5.2.2 Encrypting on PDU Basis Rather Than Segment Basis

Rather than encrypting on a segment basis or requiring a dedicated service flow for BPI key exchange messages, BPI encryption can be performed on a PDU basis (i.e., on the individual MAC frames) prior to segmentation for bonded upstream channel systems. In order for the CMTS MAC to handle mixes of unbonded upstream channel traffic and bonded upstream channel traffic, the encryption performed on individual packets uses the same rules and 12-byte offset as the conventional BPI and BPI Plus encryption techniques described above.

Figure 17:
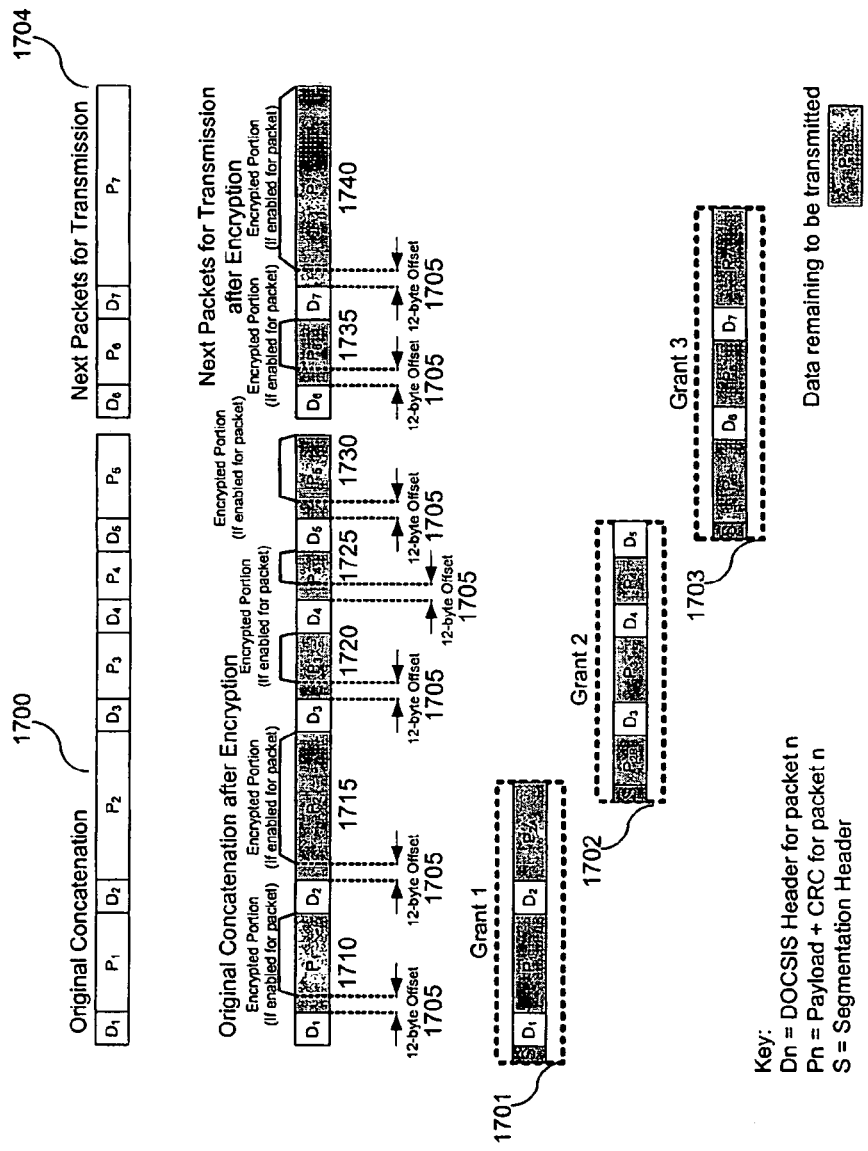
FIG. 17 illustrates an example of baseline privacy interface (BPI) encryption performed on individual MAC frames prior to segmentation in accordance with an embodiment of the present invention.

FIG. 17 illustrates an example of BPI encryption performed on a PDU basis prior to segmentation, in accordance with an embodiment of the present invention. As shown in FIG. 17, an original concatenation of packets 1700 and a queue 1704 of next packets for transmission are encrypted using conventional BPI encryption techniques. Each packet 1710, 1715, 1720, 1725, 1730, 1735 and 1740 are encrypted following a 12-byte offset 1705 from a corresponding DOCSIS header. Next, the encrypted packets are segmented into grants 1701, 1702 and 1703.

Because the piggyback field in a conventional BPI EHDR is too small to send an unburdened request in multiples of four bytes, in accordance with an embodiment of the present invention, the conventional DOCSIS BPI EHDR is modified to include a longer piggyback field for use without segment headers and no piggyback field for use with segment headers. These modified BPI EHDR types are described in more detail below in Section 7.3.1.

6. SYSTEM INITIALIZATION

Figure 18A:
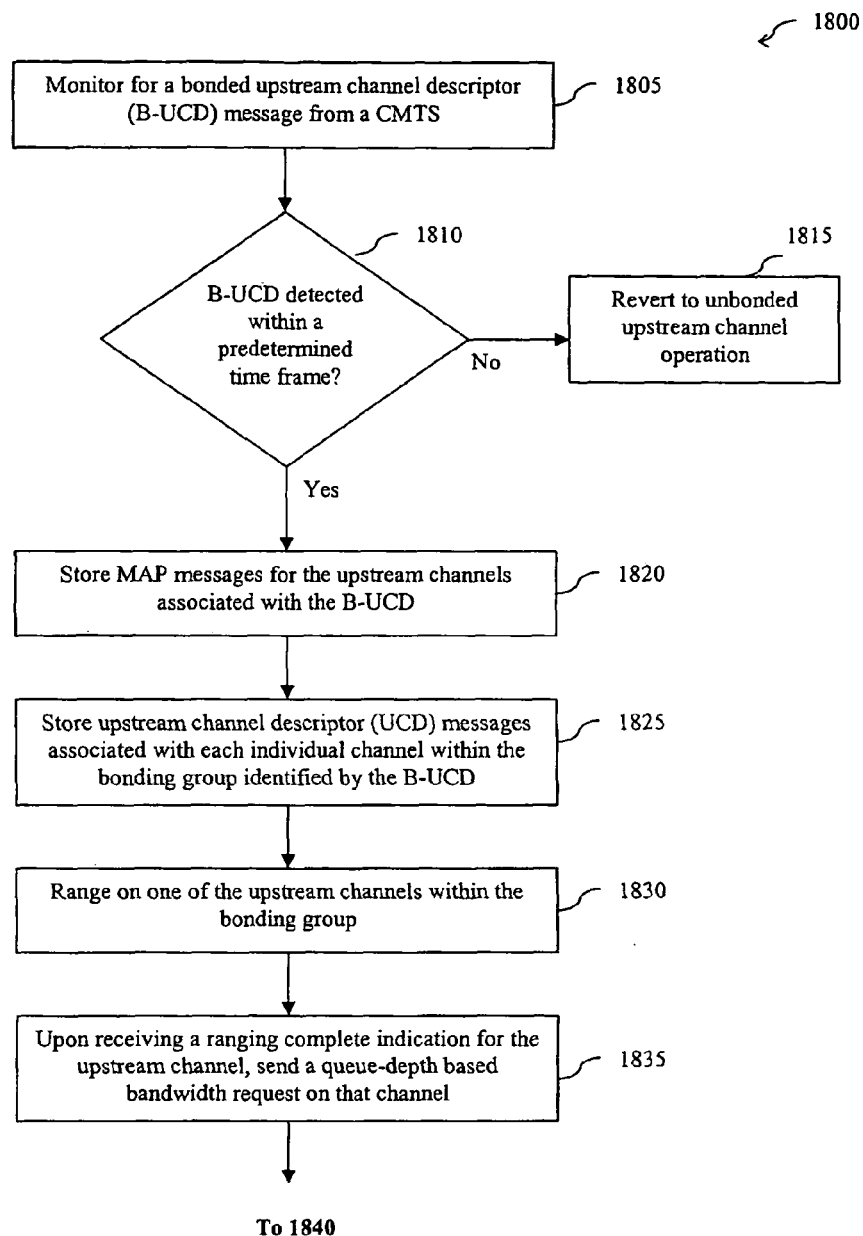
FIGS. 18A and 18B illustrate a process flowchart providing example initialization steps for a CM that supports upstream channel bonding in accordance with an embodiment of the present invention.
Figure 18B:
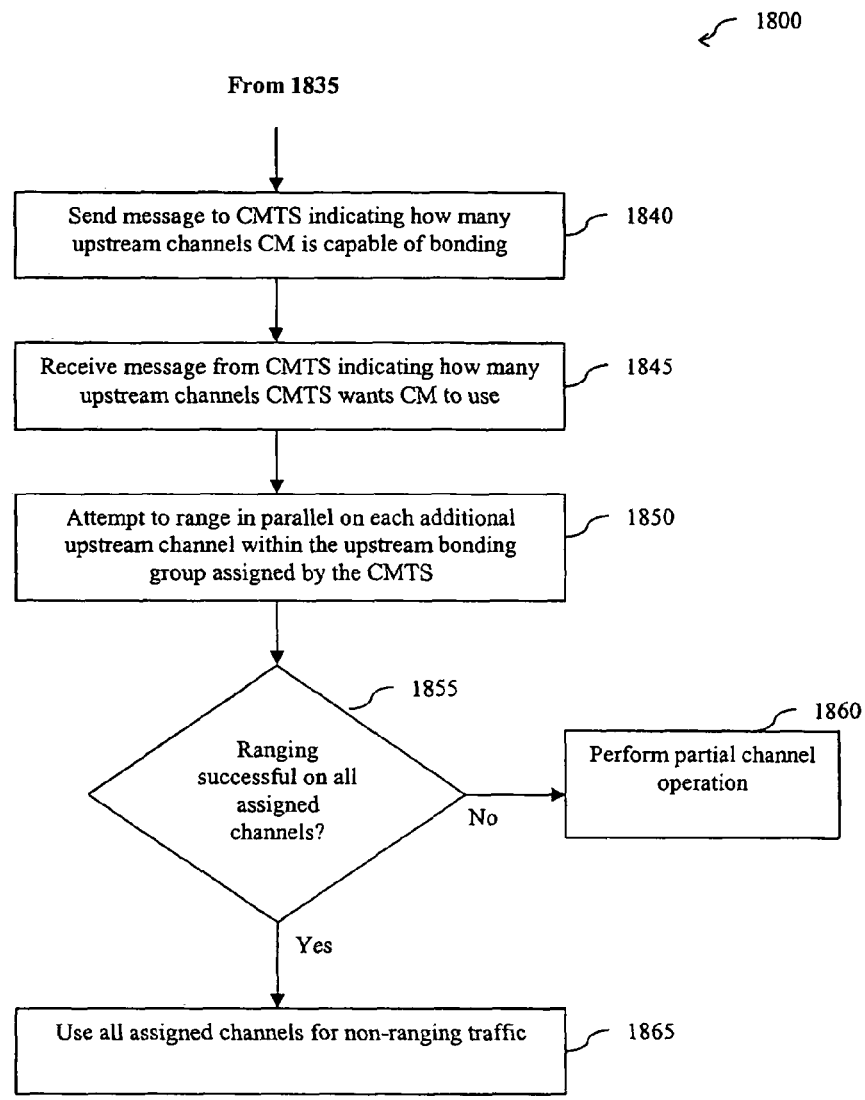

FIGS. 18A and 18B show a process flowchart 1800 providing example steps in a CM for initialization with a CMTS in a bonded upstream channel system, in accordance with an embodiment of the present invention. After the CM acquires a suitable downstream channel, the CM looks for a Bonded Upstream Channel Descriptor (B-UCD) message in step 1805. In step 1810, if the CM cannot find a B-UCD message within a predetermined timeframe, then the CM reverts to conventional unbonded upstream channel operation in step 1815.

If the CM finds a B-UCD message within the predetermined timeframe, then the CM begins storing the MAP messages for the upstream channels associated with the B-UCD in step 1820. In step 1825, the CM also begins storing upstream channel descriptor (UCD) messages associated with each individual channel within the bonding group identified by the B-UCD.

In step 1830, the CM begins to range on one of the upstream channels within the bonding group. In step 1835, once the CM receives a ranging complete indication for the upstream channel, the CM sends a queue-depth based bandwidth request on that channel to facilitate the remainder of the initialization process.

In step 1840, during a registration process, the CM tells the CMTS how many upstream channels it is capable of bonding. In step 1845, during the same registration process, the CMTS tells the CM how many upstream channels it wants the CM to use. Registration message attributes are described in more detail below in Section 7.4.3.

Prior to completion of the registration process (e.g., prior to sending a REG-ACK message to the CMTS), the CM uses additional transmitters to attempt to range in parallel on each of the additional upstream channels specified by the upstream bonding group assigned by the CMTS, as shown at step 1850. This assignment may occur by means of the DOCSIS REG-RSP message. Additionally, the ranging technique for these additional channels may be specified in the REG-RSP message. In an embodiment, if the CM is unable to range successfully on all of the specified upstream channels, it sends a REG-ACK with failure codes to the CMTS.

At step 1855, the CM ultimately determines whether it has successfully ranged on all of the specified upstream channels. If it has, then the CM can use each of the specified upstream channels for non-ranging traffic as shown at step 1865. If it has not, then the CM will perform partial channel operation (described below), in which only a subset of the specified upstream channels is used for non-ranging traffic as shown at step 1860.

In accordance with an embodiment of the present invention, the CMTS must continue to provide unicast ranging opportunities to the CM for each upstream channel within the bonding group for which the CM has been sent a ranging complete indication. If the CM does not receive a unicast ranging opportunity within a predetermined timeframe (e.g., the conventional DOCSIS T4 timeframe), or reaches a retry threshold on sending ranging request packets (e.g., conventional DOCSIS RNG-REQ messages), then the CM will remove the associated upstream channel from its list of usable upstream channels and continue operating on the remaining upstream channels as described in the section below on Partial Channel Operation.

6.1 Partial Channel Operation

If at any time after entering the operational state, the CM exceeds its retry threshold on station ranging or does not receive a unicast ranging opportunity for a given upstream channel within a predetermined timeframe (e.g., the conventional DOCSIS T4 timeframe), the CM considers itself no longer ranged on that particular upstream and ceases transmitting anything but ranging packets on that upstream. The CM must respond to unicast ranging opportunities on the upstream, but must not transmit any non-ranging packets until receiving a ranging complete for that upstream.

Eventually, the CMTS realizes that the CM is no longer ranged on that upstream. The CMTS may respond with any of the following: (1) allow the CM to continue operating on the remaining channels within the bonding group and allocate grants over only the remaining channels for which the CM is ranged; (2) instruct the CM to move via DCC to a different bonding group that does not contain the problematic channel; (3) if the problem is widespread, the CMTS may elect to remove the problematic channel from the bonding group by changing the B-UCD; or (4) the CMTS may instruct the CM to reboot via an appropriate message.

7. DETAILED MAC CHANGES

As described above, in an embodiment, the upstream channel bonding technique of the present invention is implemented as an extension of conventional DOCSIS interface specifications. Thus, several new and modified MAC formats are introduced below to extend conventional DOCSIS interface specifications to support upstream channel bonding.

7.1 Request Message

In order for a CMTS to distinguish between conventional DOCSIS bandwidth requests based on burdened minislots and bandwidth requests for bonded upstream channels based on unburdened bytes, a new request header is defined, in accordance with an embodiment of the present invention. The new header is ignored by conventional DOCSIS systems. For example, Table 3 shows the conventional DOCSIS 2.0 FC_PARM fields extended to include a new Queue-Depth Based Request Frame type for bonded upstream channel systems.

TABLE 3

MAC-Specific Headers and Frame Types

| FC_PARM | Header/Frame Type |
|---|---|
| 00000 | Timing Header |
| 00001 | MAC Management Header |
| 00010 | Conventional Request Frame |
| 00011 | Fragmentation Header |
| 00100 | Queue-Depth Based Request Frame |
| 11100 | Concatenation Header |

Figure 19:
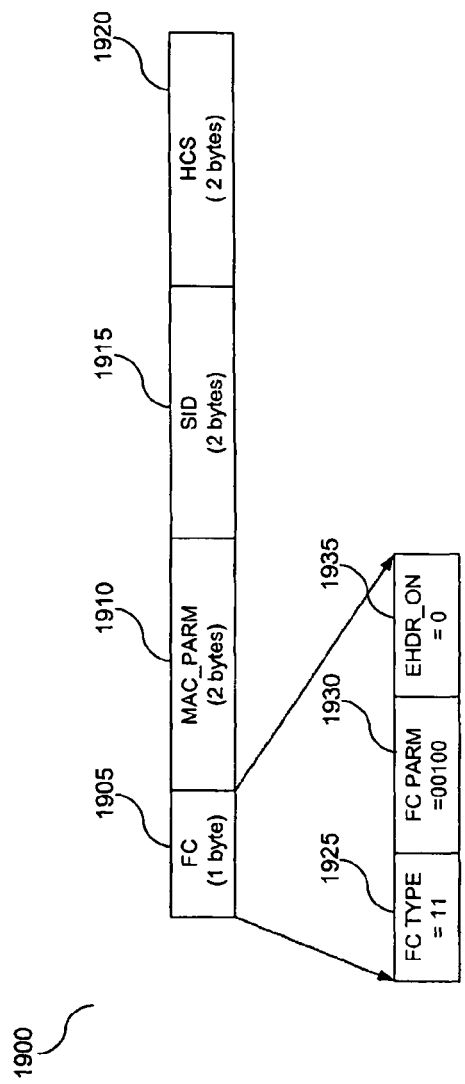
FIG. 19 illustrates a queue-depth based request frame format, in accordance with an embodiment of the present invention.

FIG. 19 illustrates a queue-depth based request frame format 1900, in accordance with an embodiment of the present invention. The format is similar to the format of a conventional DOCSIS Request Frame except that the MAC_PARM field is two bytes instead of one byte. As shown in FIG. 19, queue-depth based request frame 1900 includes four fields: a frame control (FC) field 1905, a MAC_PARM field 1910, a SID field 1915, and header check sequence (HCS) field 1920. FC field 1905 includes three fields: an FC TYPE field 1925, an FC PARM field 1930, and an EHDR_ON field 1935. The fields of queue-depth based request frame 1900 are further defined below in Table 4.

TABLE 4

Queue-Depth Based Request Frame Format

| Field | Usage | Size |
|---|---|---|
| FC | FC_TYPE = 11; MAC-Specific Header FC_PARM[4:0] = 00100; MAC request header only; no data PDU following EHDR_ON = 0; No EHDR allowed | 1 byte |
| MAC_PARM | REQ2, total number of bytes requested in units of N bytes where N is specified in the Bonded Upstream Channel Descriptor Message | 2 bytes |
| SID | Service ID | 2 bytes |
| EHDR | Extended MAC Header not allowed | 0 bytes |
| HCS | MAC Header Check Sequence | 2 bytes |
|  | Length of Queue-Depth Based Request MAC Header | 7 bytes |

7.2 Segment Header Formats

Figure 20:
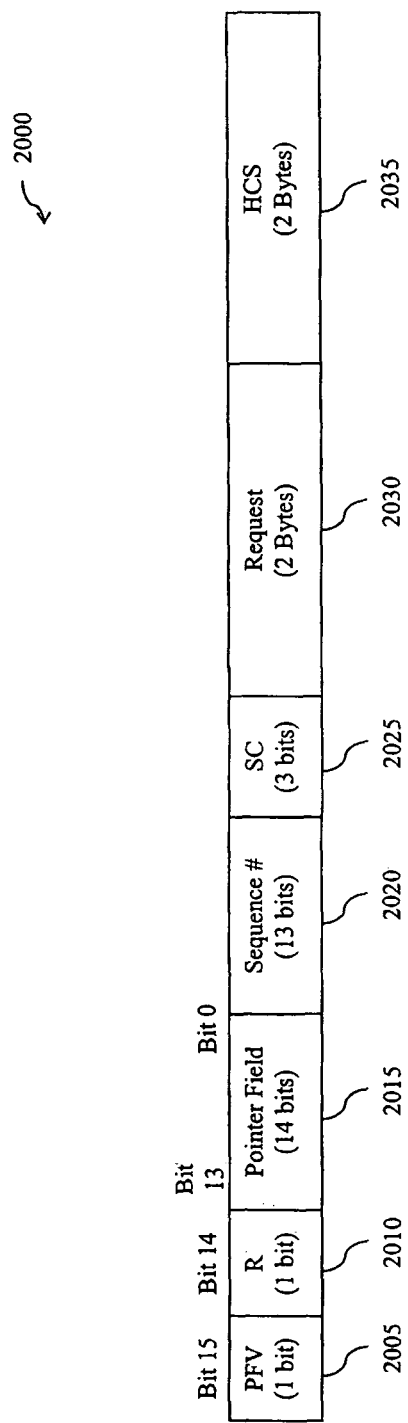
FIG. 20 illustrates a segment header format, in accordance with an embodiment of the present invention.

As described above, in order to implement fragmentation with bonded upstream channels, segment headers can be inserted into each segment. FIG. 20 illustrates a segment header format 2000, in accordance with an embodiment of the present invention. The segment header is eight bytes in length. As shown in FIG. 20, segment header 2000 includes seven fields: a pointer field valid (PFV) field 2005, a reserved (R) field 2010, a pointer field 2015, a sequence number 2020, a SID_Cluster (SC) field 2025, a request field 2030 and a MAC header check sequence (HCS) field 2035. The fields of segment header 2000 are further defined below in Table 5.

TABLE 5

Segment Header Fields

| Field | Usage | Size |
|---|---|---|
| PFV | Pointer Field Valid. This bit is set to a one to indicate that the pointer field is valid. When cleared to a zero, this bit indicates that there is not a valid pointer in the pointer field. | 1 bit |
| R | Reserved. This field should be set to a zero by the CM. | 1 bit |
| Pointer Field | When the PFV bit is a 1, the value in this field is the number of bytes past the end of the segment header that the receiver must skip when looking for a DOCSIS MAC Header. Thus, a value of zero in the pointer field with the PFV set to one would designate a DOCSIS MAC header beginning just after the segment header. | 14 bits |
| Sequence # | Sequence number that increments by 1 for every segment of a particular service flow | 13 bits |
| SC | SID_Cluster associated with the Request in the next field of the segment header. Valid SID_Cluster range is 0 to M − 1, where M is the number of SID_Clusters assigned to this service flow | 3 bits |
| Request | The total number of bytes requested in units of N bytes where N is specified in the Bonded Upstream Channel Descriptor Message. | 2 bytes |
| HCS | MAC Header Check Sequence. Similar to HCS used on all MAC headers and is calculated over all other fields in the segment header. | 2 bytes |

7.3 Extended Header Formats

In accordance with one or more embodiments of the present invention, several new DOCSIS EHDR types and lengths can be added to conventional DOCSIS specifications to accommodate upstream channel bonding, as shown below in Table 6. The new EHDR types include: EH_Type=1 with EH_LEN=4, and EH_Type=7 with EH_LEN of 3 and 5.

TABLE 6

Extended Header Formats

| EH_Type | EH_LEN | EH_VALUE |
|---|---|---|
| 0 | 0 | Null configuration setting; may be used to pad the extended header. The EH_LEN must be 0, but the configuration setting may be repeated. |
| 1 | 3 | Request in minislots. Request (1 byte); SID (2 bytes) [CM→CMTS] |
| 1 | 4 | Queue-depth based Request in Nxbytes; N is specified in the B-UCD; Request (2 bytes); SID (2 bytes) [CM→CMTS] |
| 2 | 2 | Acknowledgment requested; SID (2 bytes) [CM→CMTS] |
| 3 (BP_UP) | 4 | Upstream Privacy EH Element [DOCSIS8] |
|  | 5 | Upstream Privacy with Fragmentation EH Element [DOCSIS8] |
| 4 (BP_DOWN) | 4 | Downstream Privacy EH Element [DOCSIS8] |
| 5 | 1 | Service Flow EH Element; Payload Header Suppression Header Downstream |
| 6 | 1 | Service Flow EH Element; Payload Header Suppression Header Upstream |
| 6 | 2 | Service Flow EH Element; Payload Header Suppression Header Upstream (1 byte), Unsolicited Grant Synchronization Header (1 byte) |
| 7 (BP_UP2) | 3 | Upstream Privacy EH Element with no piggyback request |
| 7 (BP_UP2) | 5 | Upstream Privacy EH Element with piggyback queue-depth based request in Nxbytes where N is specified in the B-UCD |
| 8-9 |  | Reserved |
| 10-14 |  | Reserved [CM↔CM] |
| 15 | XX | Extended EH Element; EHX_TYPE (1 byte), EHX_LEN (1 byte), EH_VALUE (length determined by EHX_LEN) |

Table 6 and some of the subsequent tables included herein refer to a byte request multiplier (denoted "N") that is specified in a B-UCD message. Note, however, that in an alternate embodiment of the present invention, the byte request multiplier is instead encoded as a service flow parameter that is relayed during the cable modem registration process.

7.3.1 Request EHDR With Length 4

When upstream channel bonding is enabled for a CM and segment headers are disabled for a given service flow, the CM may have occasion to piggyback requests on packets without Baseline Privacy headers. To handle this case, a second type of request EHDR with a length of 4 can be used in accordance with an embodiment of the present invention, as shown below in Table 7.

TABLE 7

Request EHDR with Length 4

| EH Element Field | Usage | Size |
|---|---|---|
| EH_TYPE | EH_TYPE = 1 | 4 bits |
| EH_LEN | EH_LEN = 4 for segment header off operation | 4 bits |
| EH_VALUE | Request in multiples of N bytes (2 bytes), SID (2 bytes); N is specified in B-UCD. | 4 bytes |

In accordance with an embodiment of the present invention, the BP_UP2 EHDR can be used when upstream channel bonding and Baseline Privacy are enabled. When upstream channel bonding is enabled for a CM and segment headers are enabled for a given SID, any piggyback requests for that SID will use the piggyback opportunity in the segment header. Thus, a piggyback field is not needed in the BPI EHDR for that SID. The CM will use the BPI_UP2 EHDR with a length of 3 for SIDs with segment headers enabled. The fields of the BPI_UP2 EHDR with a length of 3 are shown below in Table 8.

TABLE 8

BP_UP2 EHDR with Length 3 (Segment Headers Enabled)

| EH Element Field | Usage | Size |
|---|---|---|
| EH_TYPE | EH_TYPE = 7 for bonded channel usage | 4 bits |
| EH_LEN | EH_LEN = 3 for segment header on operation | 4 bits |
| EH_VALUE | KeySEQ(4 bits), Version (4 bits), Enable (1 bit), Toggle (1 bit), SID (14 bits) | 3 bytes |

When channel bonding is enabled for the CM and segment headers are disabled for a given service flow, the BPI EHDR allows for a piggyback request opportunity. The CM will use the BPI_UP2 EHDR with a length of 5 for SIDs with segment headers disabled. The fields of the BPI_UP2 EHDR with a length of 5 are shown below in Table 9.

TABLE 9

BP_UP2 EHDR with Length 5 (Segment Headers Disabled)

| EH Element Field | Usage | Size |
|---|---|---|
| EH_TYPE | EH_TYPE = 7 for bonded channel usage | 4 bits |
| EH_LEN | EH_LEN = 5 for segment header off operation | 4 bits |
| EH_VALUE | KeySEQ(4 bits), Version (4 bits), Enable (1 bit), Toggle (1 bit), SiD (14 bits), Request (2 bytes) | 5 bytes |

7.4 MAC Management Message Changes

In accordance with one or more embodiments of the present invention, several MAC Management Message attributes are modified and several new MAC Management Messages are created in order to support bonded upstream channels. These modified MAC Management Messages and new MAC Management Messages are identified below in Table 10.

TABLE 10

New and Modified MAC Management Messages

| Change | Type Value | Version | Message Name | Message Description |
|---|---|---|---|---|
| Modified | 6 | 1 | REG-REQ | Registration Request |
| Modified | 7 | 1 | REG-RSP | Registration Response |
| Modified | 14 | 2 | REG-ACK | Registration Acknowledgement |
| Modified | 32 | 2 | DCC-REQ | Dynamic Channel Change Request |
| New | 34 | 4 | B-UCD | Bonded Upstream Channel Descriptor |
| New | 36 | 4 | B-RNG-Abort | Bonded Channel Ranging Abort |
| New | 37 | 4 | B-RNG-Abort-ACK | Bonded Channel Ranging Abort Acknowledgement |

7.4.1 Bonded Upstream Channel Descriptor (B-UCD)

In accordance with an embodiment of the present invention, a bonded upstream channel descriptor (B-UCD) message is transmitted by a CMTS at a periodic interval to define the characteristics of a group of bonded upstream channels. A separate B-UCD message must be transmitted for each group of bonded upstream channels. The first portion of the B-UCD format is similar to the format of a conventional DOCSIS single-channel upstream channel descriptor (UCD) message, so that the same type of filtering can be used for filtering channel ID and change count. The CMTS must also transmit UCD messages for each of the individual channels within each group of bonded upstream channels.

Figure 21:
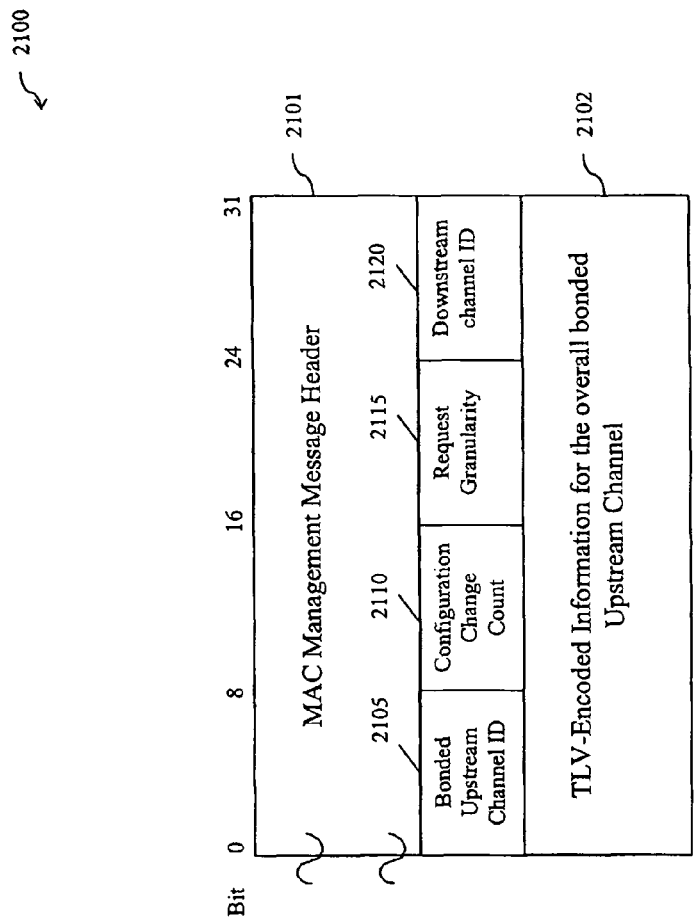
FIG. 21 illustrates a bonded upstream channel descriptor (B-UCD) message format, in accordance with an embodiment of the present invention.

FIG. 21 illustrates a B-UCD message format 2100 in accordance with an embodiment of the present invention. B-UCD message format 2100 includes a MAC management message header 2101, type length value (TLV) tuple encoded information for the overall bonded upstream channel 2102, and the following parameters: a bonded upstream channel identifier 2105, a configuration change count 2110, a request granularity parameter 2115, and a downstream channel identifier 2120. These four parameters 2105, 2110, 2115 and 2120 are defined as follows:

Bonded Upstream Channel ID. The identifier of the upstream bonded channel to which this message refers. This identifier is arbitrarily chosen by the CMTS and is only unique within the MAC-Sublayer domain. Note: Upstream Channel ID=0 is reserved to indicate telephony return [DOCSIS6].

Configuration Change Count. Incremented by one (modulo the field size) by the CMTS whenever any of the values of this channel descriptor change. If the value of this count in a subsequent UCD remains the same, the CM can quickly decide that the channel operating parameters have not changed, and may be able to disregard the remainder of the message.

Request Granularity. This field specifies the granularity N of the type 2 request in bytes. Legal values are N=1, 2, 4, 8, and 16.

Downstream Channel ID. The identifier of the downstream channel on which this message has been transmitted. This identifier is arbitrarily chosen by the CMTS and is only unique within the MAC-Sublayer domain.

All other parameters are coded as TLV tuples 2102. The type values used are defined below in Table 11.

TABLE 11

Bonded Channel TLV Parameters

| Name | Type (1 byte) | Length (1 byte) | Value (Variable Length) |
|---|---|---|---|
| Bonding Group Size | 1 | 1 | Number of channels within this bonding group (1 to M). |
| Subchannel | 2 | 1 | Channel ID within bonded group. This TLV is repeated for every upstream channel within the bonded group. |

Figure 22:
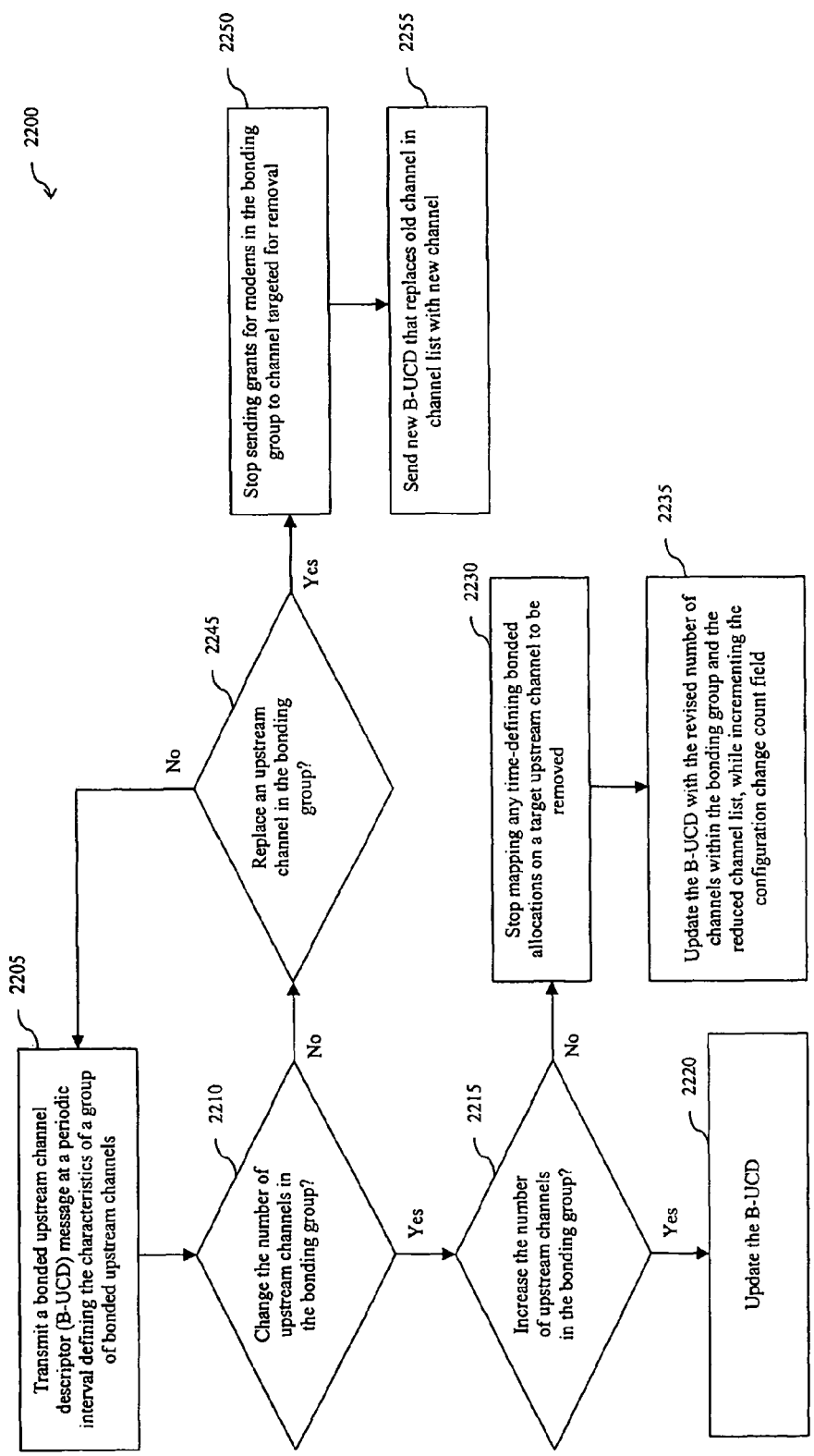
FIG. 22 illustrates a process flowchart providing example steps in a CMTS for using a B-UCD message to change the channel configuration within a group of bonded upstream channels in accordance with one or more embodiments of the present invention.

The CMTS can use the B-UCD message to change the number of channels within a bonding group. For example, the CMTS can use the B-UCD message to increase or decrease the number of channels within the bonding group, and the CMTS can also use the B-UCD message to replace channels within the bonding group by using a two-step process. FIG. 22 illustrates a process flowchart 2200 providing example steps for a CMTS for using a B-UCD message to change the channel configuration within a group of bonded upstream channels, in accordance with an embodiment of the present invention. In step 2205, the CMTS transmits a B-UCD message at a periodic interval that defines the characteristics of the bonding group.

7.4.1.1 Removing Channel from Upstream Bonding Group

If, in step 2210, the CMTS decides to change the number of channels in the bonding group, then process 2200 proceeds to step 2215. If, in step 2215, the CMTS decides to remove a channel in the bonding group, then process 2200 proceeds to step 2230. In order to remove an upstream channel from the bonding group, the CMTS must first stop mapping any time-defining bonded allocations (i.e., allocations to request regions, ranging regions, data grants, etc.) on the target upstream channel to be removed in step 2230. Next, in step 2235, the CMTS updates the B-UCD with the revised number of channels within the bonding group and the reduced channel list, while incrementing the configuration change count field. Since there is no change count in the MAP messages that correspond to the change count in the B-UCD, the change at the CM will occur as the CM processes the B-UCD message. Thus, the CMTS must stop sending grants to the bonded CMs on the target channel well before transmitting the new B-UCD.

7.4.1.2 Adding Channel to Upstream Bonding Group

If, in step 2215, the CMTS decides to add a channel to the bonding group, then process 2200 proceeds to step 2220. When the CMTS wants to add an upstream channel to a bonding group, the CMTS updates the B-UCD as shown in step 2220. The CMs that can add the additional upstream channel (based on the maximum number of bonded channels specified during registration) will then try to range on the new upstream channel. This ranging may be implemented using the ranging technique specified in reference to the REG_RSP message.

7.4.1.3 Replacing Channel in Upstream Bonding Group

If, in step 2210, the CMTS decides not to change the number of channels in the bonding group, then process 2200 proceeds to step 2245. If, in step 2245, the CMTS decides to replace a channel in the bonding group, then process 2200 proceeds to step 2250. To replace a channel in an upstream bonding group with another channel, the CMTS must first stop sending grants for modems in the bonding group to the channel targeted for removal as shown at step 2250. Then, the CMTS must send a new B-UCD that replaces the old channel in the channel list with the new channel as shown in step 2255.

The CMTS must also update the change count in the B-UCD. Since there is no change count in the map messages that that corresponds to the B-UCD change count, the change at the CM will occur as the CM processes the B-UCD message. Thus, the CMTS must stop sending grants to the bonded CMs on the target deletion channel well before transmitting the new B-UCD. When the CM receives the B-UCD with the replacement, it must discard any outstanding requests that were transmitted on the replaced channel. The CMs that can add the additional upstream channel (based on the maximum number of bonded channels specified during registration) must then try to range on the new upstream channel. This ranging may be implemented using the ranging technique specified in reference to the REG_RSP message.

7.4.2 MAP Messages

In accordance with an embodiment of the present invention, MAP messages are sent unbonded in the downstream. While an embodiment of the present invention uses the legacy (i.e., conventional DOCSIS) MAP structure, a modified definition of the Acknowledgment time is also provided to allow the CMTS more flexibility. The new definition is: latest time, from CMTS initialization (mini-slots), processed and reflected (with a grant or grant pending) in the MAP for this channel.

7.4.3 Registration Messages

In accordance with one or more embodiments of the present invention, the following registration parameters are modified or added to the conventional DOCSIS specifications to control the use of upstream channel bonding.

7.4.3.1 Upstream Channel Bonding Capability TLV

The value field of the conventional DOCSIS Modem Capabilities Encoding describes the capabilities of a particular CM, such as implementation dependent limits on the particular features or number of features which the CM can support. In accordance with an embodiment of the present invention, an Upstream Channel Bonding Capability TLV parameter is added to the conventional DOCSIS Modem Capabilities Encoding and its value represents the Upstream Channel Bonding Support of the CM. The type is 5.13 and the length is 1 byte. The values are as follows: 0=no support of segmentation or upstream channel bonding; 1=support only of segmentation on a single upstream channel; 2=support for upstream channel bonding across 2 channels; M=support for upstream channel bonding across M channels (with a maximum value of M=255).

7.4.3.2 Maximum Concatenated Burst TLV

The Maximum Concatenated Burst TLV parameter is part of the conventional Upstream-Specific QoS Parameter Encodings and defines the maximum concatenated burst (in bytes) that a Service Flow is allowed. Because the concept of concatenation is different with upstream channel bonding, in accordance with an embodiment of the present invention, this parameter is changed when upstream channel bonding is active to define the maximum number of bytes for which a CM may ask in a single request.

7.4.3.3 Maximum Request Bytes Outstanding TLV

In accordance with an embodiment of the present invention, the Maximum Request Outstanding TLV parameter is added to the Upstream-Specific QoS Parameter Encodings for conventional DOCSIS systems to handle upstream channel bonding. This parameter limits the amount of bandwidth for which the CM has a request outstanding. The type is 24.25 and the length is 4. The value is the maximum number of bytes for which the CM may have a request outstanding. Combined with the modified the Maximum Concatenated Burst TLV parameter discuss above, this parameter replaces the functionality provided by the Maximum Concatenated Burst in conventional DOCSIS systems.

7.4.3.4 Request/Transmission Policy TLV

The Request/Transmission Policy TLV parameter in the Upstream-Specific QoS Parameter Encodings specifies attributes of the request/grant process for a given service flow. In accordance with an embodiment of the present invention, this parameter is modified to include an additional value defined to control the use of segment headers and outstanding requests. The type is 24.16 and the length is 4. The values are 9=The Service Flow Must Not use segment headers and 10=The Service Flow Must Not use contention regions for transmitting multiple outstanding bandwidth requests.

7.4.3.5 Secondary Channel Ranging Technique TLV

The Secondary Channel Ranging Technique TLV parameter specifies the ranging technique to be used by the CM when initially ranging on secondary upstream channels. The length is 1 and the values are 0=use broadcast initial ranging region; 1=use unicast initial ranging region; 2=use either broadcast or unicast initial ranging regions.

7.4.4 Configuration File Changes

The following describes configuration file changes in accordance with an embodiment of the present invention.

7.4.4.1 Limit on Number of Outstanding Requests

This parameter allows the operator to limit the number of requests per SID_Cluster that a particular service flow may have outstanding. For example, if this value is one, the CM may only make one request at a time per SID_Cluster. In accordance with an embodiment of the present invention, if this parameter is omitted in a CM-initiated DSx request or REG-REQ, the CMTS must specify a number in the corresponding response. The type is 24. (to be determined), the length is 1, and the value is maximum number of requests outstanding (a value of zero means the limit is not specified).

7.4.4.2 Upstream Bonding Group Override

When present, this parameter provides an override to the upstream bonding group. The length is 1 and the value is the Channel ID for upstream bonding group.

7.4.5 DCC-REQ Messages

In accordance with an embodiment of the present invention, the meaning of a Dynamic Channel Change (DCC) message is modified for upstream channel bonding operation. In conventional DOCSIS systems, the CMTS may transmit a DCC Request (DCC-REQ) message to cause a CM to change the upstream channel on which it is transmitting, the downstream channel it is receiving, or both.

7.4.5.1 Bonded Upstream Channel ID

When present, a Bonded Upstream Channel ID TLV specifies a new bonded upstream channel ID that the CM must use when performing a Dynamic Channel Change. The Bonded Upstream Channel ID TLV is an override for the current bonded upstream channel ID. The CMTS must ensure that the Bonded Upstream Channel ID for the new channel is different than the Bonded Upstream Channel ID for the old channel.

The Bonded Upstream Channel ID TLV must be included if the upstream bonding group is changed. The Bonded Upstream Channel ID TLV is used for moving the CM to a different upstream bonding group, moving the CM from a bonded upstream channel to an unbonded upstream channel, and moving the CM from an unbonded upstream channel to a bonded upstream channel.

The type is 9 and the length is 1. The value is 0-255; Bonded Upstream Channel ID. A value of zero indicates that the CM is being moved to a channel without upstream channel bonding. When the value is zero, the upstream channel ID TLV must also be included to instruct the CM where to move. Note that in this instant, the new upstream channel ID may match the current upstream channel ID for the case where the CM is being removed from a bonding group, but remaining on one of the individual upstream channels within the bonding group.

7.5 Transmission Region Ordering

The following describes transmission region ordering in accordance with an embodiment of the present invention.

7.5.1 Counting Contention Regions

In accordance with an embodiment of the present invention, the CM must defer contention request opportunities across all channels in the bonded channel group in time order according to the following rules:

(1) whenever the start times of TDMA request opportunities on two or more upstream channels are identical, the CM may select the ordering among these opportunities;

(2) TDMA contention opportunities on a channel shall be deferred in time order although not necessarily consecutively due to opportunities on other channels in the bonding group; and (3) S-CDMA contention opportunities in a later S-CDMA frame shall not be ordered prior to contention opportunities in an earlier S-CDMA frame on the same channel.

7.6.2 Ordering Traffic Across Segments

In accordance with an embodiment of the present invention, the CM must place traffic into segments based on the start time of each segment. Traffic at the head of the service flow queue must be placed into the segment which is transmitted first with the following exceptions:

(1) whenever the start times of TDMA transmit opportunities on two or more upstream channels are identical, the CM may select the ordering among these opportunities;

(2) TDMA transmit opportunities on a channel shall be used for segmentation in time order; and (3) S-CDMA transmission opportunities in a later S-CDMA frame shall not be ordered prior to transmission opportunities in an earlier S-CDMA frame on the same channel.

8. SYSTEM SYNCHRONIZATION REQUIREMENTS

An embodiment of the present invention requires that the upstream channels within a bonding group are associated with a single downstream channel or multiple downstream channels that are synchronized together. For example, as shown in FIG. 1, system 100 includes a master clock source 116 to aid in such synchronization.

This synchronization requirement implies that the CM can use a single recovered clock to generate the timing required for transmission on all the channels within the bonded upstream group. The phase of the master clock source can be shifted from one upstream channel to another and this phase difference is accounted for through ranging.

The CM will range on each of the channels within an upstream bonded group and may possibly have a different ranging offset for each of the channels.

9. MISCELLANEOUS CHANGES

The following describes miscellaneous changes to the conventional DOCSIS specification for implementing upstream channel bonding in accordance with an embodiment of the present invention.

9.1 Dynamic UCD Changes

For conventional DOCSIS "on-the-fly" UCD changes, the CM and CMTS forget outstanding requests that impact the request/grant size. The CMs then switch to the new channel parameters and re-request for bandwidth using the new parameters. With the byte-based requesting, CCF, and multi-channel scheduling features of the present invention, operation for dynamic UCD changes must be clarified. Since the CM sends requests in bytes and has no idea on what channels within the bonding group the requests will be granted, the CM must not forget outstanding requests for any UCD changes. The CMTS may either discard requests that it had planned to allocate to the changing channel, or modify the grants allocated for that channel to match the new UCD parameters. Should the CMTS discard the requests, the CM will eventually re-request for the necessary bandwidth. For channel changes that involve tics per minislot changes or changes involving the SCDMA enable, the CM request times stored for the changed upstream channel are no longer applicable to the new upstream channel parameters. For these cases, the CM must replace the stored request time for that channel for all outstanding requests with the allocation start time of the first MAP the CM receives with the new UCD change count for that channel.

9.2 Appendix B Changes

Appendix B will be modified such that the definition for CM MAP processing time is the time provided between the arrival of the last bit of a MAP at a CM and the effectiveness of that MAP.

9.3 Changes to CM and CMTS Ranging

In accordance with an embodiment of the present invention, the DOCSIS MAC requirements for CM-CMTS interactions are modified to require that a CMTS send unicast maintenance opportunities to a CM for all channels within the upstream bonding group. Also, a CM should be prevented from rebooting if it has a T4 on one of its upstream channels.

10. DISCUSSION OF OTHER MECHANISMS FOR BONDING CHANNELS

Other mechanisms for bonding upstream channels to achieve a higher bandwidth "pipe" in the upstream are described below in the following sections. As described above, systems implementing bonded upstream channels provide increased data rate and throughput, and in turn, benefit from an increased statistical multiplexing gain and automatic load balancing, as compared to systems not implementing bonded upstream channels.

10.1 Bonding at the Physical Layer (PHY)

One approach to bonding at the physical layer is to use a single wideband channel to provide higher maximum throughput and increased statistical multiplexing gain. Unlike previously described embodiments of the present invention, this approach does not allow CMs not implementing upstream channel bonding to use the complete spectrum, and does not allow CMs not implementing upstream channel bonding and CMs implementing upstream channel bonding to efficiently share the same wider spectrum.

A second approach to bonding at the physical layer coding level is to code across multiple channels. The coding includes Forward Error Correction, related interleaving, and scrambling. Unlike previously described embodiments of the present invention, for which channel bonding takes place above the physical layer, this approach couples the channel bonding implementation to PHY coding, thereby making it potentially cumbersome for making changes to coding without impacting the upstream channel bonding implementation.

10.2 Variations of Bonding at the MAC Layer

In accordance with previously described embodiments of the present invention, if upstream channel bonding takes place at the level of a transmitted segment, the segment can be transmitted on any of the channels in the bonded channel group, independent of how the request was made or on which channel the request was made. After it is determined that the segment is to be transmitted on a particular channel via a grant from the CMTS, the segment is transmitted at the appropriate time using the channel and burst-specific parameters defined for that channel.

A segment on a channel within a bonded channel group can be a single complete DOCSIS frame, a concatenation of DOCSIS frames, a fragment of a DOCSIS frame, or a concatenation of DOCSIS frames. The concatenation of DOCSIS frames can be cut off at any point, which may or may not be a frame boundary due to some kind of segmentation. Thus, in accordance with previously described embodiments of the present invention, bonding at the MAC layer segment boundary provides more flexibility at the DOCSIS MAC layer, while preserving the signal processing structure and flexibility of the physical layer. Two variations for upstream channel bonding at the MAC layer are described below.

10.2.1 Requiring Identical Channel Parameters

One variation of MAC layer bonding requires that a CMTS grant a CM transmission opportunities on all bonded channels simultaneously and for the same time duration. Unlike previously described embodiments of the present invention, this approach is not flexible enough to efficiently accommodate, on the same channels, CMs that do not support upstream channel bonding in addition to UGS opportunities for various services. This approach is also restrictive with respect to the scheduling implementation when channels have different PHY parameters, such as data rates, modulation orders, and minislot sizes, among others.

10.2.2 CM Controlling Bonding

Another variation of MAC layer bonding allows the CM a great deal of "decision making" in regards to what channel in a bonded channel group to use and how to order the data. This approach, which allows the CM to decide what upstream channels to use at particular times, can complicate system testing and verification because the CM does not behave deterministically. With each CM behaving differently, this non-deterministic behavior can make field debug difficult.

In accordance with an embodiment of the present invention, a CMTS scheduler schedules all transmission opportunities on the channels in a bonded channel group, whether those transmissions are dedicated, granted, or contention opportunities. Unlike the approach of CM controlled upstream scheduling, CM behavior is deterministic and specified by the CMTS's bandwidth allocation. With CMTS controlled upstream scheduling, the CMTS is the only entity that knows the loading on each of the upstream channels, and, as such, is the only entity capable of accurately performing load balancing and deciding the channel or channels on which a CM should transmit.

10.3 Bonding at Higher Layers than the MAC Layer

An alternative approach to MAC layer bonding and segmenting at the MAC layer is fragmenting at the IP layer. IP fragmentation is an option for segmenting data to fit within a granted amount from a CMTS. However, each IP fragment has the same format as the original IP datagram. In particular, the minimum IP header of twenty bytes is included in each fragment. Thus, long packets that need to be fragmented multiple times will incur the IP overhead multiple times. Other schemes for fragmentation on the upstream at layers higher than the MAC layer would also incur additional overhead if the higher-level header is repeated multiple times for each fragment, in addition to multiple occurrences of the DOCSIS MAC header on each individual grant.

In accordance with an embodiment of the present invention, segmentation of data to fit within a granted amount from a CMTS is performed at the MAC layer. The segmentation overhead of this approach is more efficient than the conventional DOCSIS fragmentation approach and approaches for fragmenting at layers higher than the MAC layer.

11. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of operating a cable modem termination system (CMTS) for high-throughput bandwidth allocation in a cable network, comprising:
   bonding a plurality of upstream channels to form an upstream bonded group;
   receiving an unburdened bandwidth request from a cable modem, the unburdened bandwidth request being based on queue depth, the queue depth providing an indication of all available upstream packets and a plurality of media access controller headers of the available upstream packets; and
   responsive to receiving the unburdened bandwidth request, issuing a unique bandwidth allocation message for each upstream channel of the upstream bonded group, wherein a combination of unique bandwidth allocation messages collectively allocates the requested unburdened bandwidth among channels of the upstream bonded group for use by the cable modem in transmitting a stream of data packets to the CMTS.

2. The method of claim 1, wherein issuing a unique bandwidth allocation message for each upstream channel in the upstream bonded group comprises issuing a unique Data Over Cable Service Interface Specification (DOCSIS) MAP message for each upstream channel in the upstream bonded group.

3. The method of claim 1, further comprising:
   receiving a plurality of segments transmitted by the cable modem over the plurality of upstream channels in the upstream bonded group, wherein the segments are transmitted at times specified in the unique bandwidth allocation messages and wherein each segment includes a unique sequence number; and
   combining information from the segments based on the unique sequence numbers to reconstruct the stream of data packets.

4. The method of claim 1, further comprising:
   assigning a set of unique identifiers to the cable modem, wherein each unique identifier in the set of unique identifiers corresponds to a respective upstream channel in the upstream bonded group; and
   wherein receiving an unburdened bandwidth request from the cable modem comprises monitoring the plurality of upstream channels in the upstream bonded group for messages that include one of the unique identifiers in the set of unique identifiers.

5. The method of claim 4, wherein assigning the set of unique identifiers to the cable modem comprises assigning the set of unique identifiers to a service flow associated with the cable modem.

6. The method of claim 4, wherein issuing a unique bandwidth allocation message for a particular upstream channel in the upstream bonded group comprises issuing a message that includes one of the unique identifiers that is associated with the respective upstream channel and an allocation of minislots associated therewith.

7. A method of operating a cable modem for high-throughput transmission in a cable network, comprising:
   transmitting an unburdened bandwidth request to a cable modem termination system (CMTS), the unburdened bandwidth request being based on queue depth, the queue depth providing an indication of all available upstream packets and a plurality of media access controller headers of the available upstream packets;
   receiving a plurality of bandwidth allocation messages, wherein each bandwidth allocation message is uniquely associated with an upstream channel of an upstream bonded group of upstream channels, and wherein the plurality of bandwidth allocation messages collectively allocates the requested unburdened bandwidth to individual channels of the upstream bonded group of upstream channels; and
   transmitting a stream of data packets to the CMTS over the upstream bonded group of upstream channels in accordance with the plurality of bandwidth allocation messages.

8. The method of claim 7, wherein receiving a plurality of bandwidth allocation messages comprises receiving a plurality of Data Over Cable Service Interface Specification (DOCSIS) MAP messages.

9. The method of claim 7, wherein transmitting a stream of data packets to the CMTS over the upstream bonded group of upstream channels in accordance with the plurality of bandwidth allocation messages comprises:
   dividing the steam of data packets among a plurality of segments;
   inserting a unique sequence number into each of the plurality of segments; and
   transmitting each of the plurality of segments over the upstream channels in the upstream bonded group of upstream channels at times specified in the plurality of bandwidth allocation messages.

10. The method of claim 7, further comprising:
    receiving a set of unique identifiers from the CMTS, wherein each unique identifier in the set of unique identifiers corresponds to a respective upstream channel in the upstream bonded group of upstream channels; and
    wherein transmitting an unburdened bandwidth request to the CMTS comprises transmitting an unburdened bandwidth request that includes a particular one of the unique identifiers in the set of unique identifiers over the upstream channel associated with the particular one of the unique identifiers.

11. The method of claim 10, further comprising:
    associating the set of unique identifiers with a service flow.

12. The method of claim 10, wherein each of the plurality of bandwidth allocation messages includes a respective one of the set of unique identifiers and an allocation of minislots associated therewith.

13. The method of claim 7, wherein transmitting an unburdened bandwidth request comprises modifying a baseline privacy interface extended header (BPI EHDR) to include a longer piggyback field for use without segment headers or modifying the BPI EHDR to remove the piggyback field when using segment headers.

14. A system for high-throughput bandwidth allocation in a cable network, comprising:
- a cable modem termination system (CMTS) configured to bond a plurality of upstream channels in an upstream bonded group; and
- a cable modem configured to transmit an unburdened bandwidth request to the CMTS, the unburdened bandwidth request being based on queue depth, the queue depth providing an indication of all available upstream packets and a plurality of media access controller headers of the available upstream packets;
- wherein the CMTS is further configured to transmit a unique bandwidth allocation message from among a plurality of bandwith allocation messages for each upstream channel in the upstream bonded group to the cable modem, wherein a combination of unique bandwidth allocation messages collectively allocates the requested unburdened bandwidth across the upstream bonded group; and
- wherein the cable modem is further configured to transmit a stream of data packets to the CMTS over the upstream bonded group of upstream channels in accordance with the plurality of bandwidth allocation messages.

15. The system of claim 14, wherein the CMTS is configured to transmit a unique Data Over Cable Service Interface Specification (DOCSIS) MAP message for each upstream channel in the upstream bonded group to the cable modem.

16. The system of claim 14, wherein the cable modem is configured to: divide the stream of data packets among a plurality of segments, insert a unique sequence number into each of the plurality of segments, and transmit each of the plurality of segments to the CMTS over the upstream channels in the upstream bonded group at times specified in the plurality of bandwidth allocation messages.

17. The system of claim 16, wherein the CMTS is further configured to receive the plurality of segments from the CMTS and to combine information in the plurality of segments based on the unique sequence numbers to reconstruct the stream of data packets.

18. The system of claim 14, wherein the CMTS is further configured to assign a set of unique identifiers to the cable modem, wherein each unique identifier in the set of unique identifiers corresponds to a respective upstream channel in the upstream bonded group; and
- wherein the cable modem is configured to transmit a bandwidth request that includes a particular one of the unique identifiers in the set of unique identifiers to the CMTS over the upstream channel associated with the particular one of the unique identifiers.

19. The system of claim 18, wherein the CMTS is configured to assign a set of unique identifiers to a service flow associated with the cable modem.

20. The system of claim 18, wherein the CMTS is configured to transmit a unique bandwidth allocation message for a particular upstream channel that includes the one of the set of unique identifiers that is associated with the particular upstream channel and an allocation of minislots associated therewith.

* * * * *